(12) United States Patent
Scalisi

(10) Patent No.: US 11,228,739 B2
(45) Date of Patent: Jan. 18, 2022

(54) GARAGE DOOR COMMUNICATION SYSTEMS AND METHODS

(71) Applicant: SkyBell Technologies IP, LLC, Irvine, CA (US)

(72) Inventor: Joseph Frank Scalisi, Yorba Linda, CA (US)

(73) Assignee: SkyBell Technologies IP, LLC, Irvine, CA (US)

( * ) Notice: Subject to any disclaimer, the term of this patent is extended or adjusted under 35 U.S.C. 154(b) by 0 days.

(21) Appl. No.: 16/921,761

(22) Filed: Jul. 6, 2020

(65) Prior Publication Data

US 2020/0336709 A1 Oct. 22, 2020

Related U.S. Application Data

(63) Continuation of application No. 15/293,334, filed on Oct. 14, 2016, now Pat. No. 10,742,938, which is a
(Continued)

(51) Int. Cl.
*H04N 7/18* (2006.01)
*G07C 9/00* (2020.01)
(Continued)

(52) U.S. Cl.
CPC ......... *H04N 7/186* (2013.01); *G07C 9/00309* (2013.01); *G07C 9/00857* (2013.01);
(Continued)

(58) Field of Classification Search
CPC .............. H04N 7/186; G07C 9/00007; G07C 9/00857; G07C 9/00309; G07C 9/00944;
(Continued)

(56) References Cited

U.S. PATENT DOCUMENTS

| | | | |
|---|---|---|---|
| 1,647,558 | A | 11/1927 | Best |
| 1,647,708 | A | 11/1927 | Monica |

(Continued)

FOREIGN PATENT DOCUMENTS

| | | | |
|---|---|---|---|
| CN | 2131143 | Y | 4/1993 |
| CN | 1704985 | A | 12/2005 |

(Continued)

OTHER PUBLICATIONS

Craig & Comapny—Home Tech: Doorbot—Downloaded on Nov. 18, 2013 from http://www.craigncompany.com/home-tech-doorbot/; prior art publication at least as of Jun. 10, 2013.
(Continued)

*Primary Examiner* — Jared Walker
(74) *Attorney, Agent, or Firm* — Wesley E. Schwie, Esq.; Gallium Law

(57) ABSTRACT

A security system can include an electronic doorbell comprising a first camera configurable to capture an image of a first zone, a button configurable to enable a visitor to sound an electronic chime, and a first microphone configurable to capture sounds. The security system can also include an electronic garage door controller communicatively coupled to the electronic doorbell, the electronic garage door controller comprising a second camera configurable to capture an image of a second zone, and a second microphone configurable to capture sounds. The security system can also include a remote computing device communicatively coupled to at least one of the electronic doorbell and the electronic garage door controller. The remote computing device can be configurable to display at least one of the image of the first zone and the image of the second zone.

20 Claims, 19 Drawing Sheets

Related U.S. Application Data continuation-in-part of application No. 15/060,332, filed on Mar. 3, 2016, now Pat. No. 10,733,823, which is a continuation-in-part of application No. 14/861,613, filed on Sep. 22, 2015, now Pat. No. 10,044,519.

(60) Provisional application No. 62/129,814, filed on Mar. 7, 2015.

(51) Int. Cl.
    *G07C 9/20*     (2020.01)
    *G07C 9/37*     (2020.01)

(52) U.S. Cl.
    CPC ............ *G07C 9/00944* (2013.01); *G07C 9/20* (2020.01); *G07C 9/37* (2020.01); *G07C 2009/00928* (2013.01); *G07C 2209/06* (2013.01)

(58) Field of Classification Search
    CPC ...... G07C 9/00158; G07C 2009/00928; G07C 2209/06
    See application file for complete search history.

(56) References Cited

U.S. PATENT DOCUMENTS

| | | |
|---|---|---|
| 3,240,113 A | 3/1966 | Stechemesser |
| 3,708,742 A | 1/1973 | Gunn |
| 4,523,193 A | 6/1985 | Levinson |
| D283,130 S | 3/1986 | Boenning |
| D297,222 S | 8/1988 | Rauch |
| 4,843,461 A | 6/1989 | Tatsumi |
| 4,982,092 A | 1/1991 | Jehle |
| 5,210,520 A | 5/1993 | Housley |
| 5,428,388 A | 6/1995 | Von Bauer |
| 5,493,618 A | 2/1996 | Stevens |
| 5,521,578 A | 5/1996 | Delvalle |
| D371,086 S | 6/1996 | Collins |
| 5,602,580 A | 2/1997 | Tseng |
| D381,638 S | 7/1997 | Kruse |
| 5,774,569 A | 6/1998 | Waldenmaier |
| 5,781,108 A | 7/1998 | Jacob |
| 5,784,446 A | 7/1998 | Stuart |
| D404,673 S | 1/1999 | Gordon |
| 5,907,352 A | 5/1999 | Gilley |
| 5,995,139 A | 11/1999 | Lee |
| 6,028,626 A | 2/2000 | Aviv |
| D421,727 S | 3/2000 | Pierson |
| D422,521 S | 4/2000 | Morrow |
| 6,073,192 A | 6/2000 | Clapp |
| 6,094,213 A | 7/2000 | Mun |
| 6,185,294 B1 | 2/2001 | Chornenky |
| 6,226,031 B1 | 5/2001 | Barraclough |
| 6,313,743 B1 | 11/2001 | Abraham-Fuchs |
| 6,375,366 B1 | 4/2002 | Kato |
| 6,414,589 B1 | 7/2002 | Angott |
| 6,429,893 B1 | 8/2002 | Xin |
| 6,535,243 B1 | 3/2003 | Tullis |
| 6,542,078 B2 | 4/2003 | Script |
| 6,590,604 B1 | 7/2003 | Tucker |
| 6,661,340 B1 | 12/2003 | Saylor |
| 6,727,811 B1 | 4/2004 | Fendis |
| 6,753,899 B2 | 6/2004 | Lapalme |
| 6,778,084 B2 | 8/2004 | Chang |
| 6,812,970 B1 | 11/2004 | McBride |
| 6,828,909 B2 | 12/2004 | Script |
| D500,751 S | 1/2005 | Yukikado |
| D501,652 S | 2/2005 | Pierson |
| 6,870,488 B1 | 3/2005 | Compton |
| 6,928,461 B2 | 8/2005 | Tuli |
| 6,930,599 B2 | 8/2005 | Naidoo |
| 6,993,123 B1 | 1/2006 | Allen |
| 7,015,943 B2 | 3/2006 | Chiang |
| D519,100 S | 4/2006 | Shioya |
| D522,490 S | 6/2006 | Yukikado |
| D525,963 S | 8/2006 | Yukikado |
| 7,113,578 B2 | 9/2006 | Unger |
| D531,160 S | 10/2006 | Yukikado |
| 7,154,531 B2 | 12/2006 | Laird |
| 7,193,644 B2 | 3/2007 | Carter |
| 7,218,220 B1 | 5/2007 | Bovsun |
| D562,306 S | 2/2008 | Jeong |
| 7,330,112 B1 | 2/2008 | Emigh |
| 7,330,649 B2 | 2/2008 | Finizio |
| 7,375,492 B2 | 5/2008 | Calhoon |
| D577,301 S | 9/2008 | Johnson |
| 7,429,924 B2 | 9/2008 | Langer |
| 7,440,025 B2 | 10/2008 | Cheng |
| 7,460,149 B1 | 12/2008 | Donovan |
| 7,477,134 B2 | 1/2009 | Langer |
| 7,486,271 B2 | 2/2009 | Hershkovitz |
| 7,492,303 B1 | 2/2009 | Levitan |
| D588,574 S | 3/2009 | Takahata |
| 7,526,102 B2 | 4/2009 | Ozer |
| D595,260 S | 6/2009 | Takahata |
| 7,583,191 B2 | 9/2009 | Zinser |
| 7,701,171 B2 | 4/2010 | Defant |
| 7,738,917 B2 | 6/2010 | Ryley |
| 7,746,223 B2 | 6/2010 | Howarter |
| 7,751,285 B1 | 7/2010 | Cain |
| 7,752,070 B2 | 7/2010 | Hatcher |
| 7,809,966 B2 | 10/2010 | Imao |
| 7,826,729 B2 | 11/2010 | Cullen |
| 7,956,576 B2 | 6/2011 | Neu |
| 7,991,381 B1 | 8/2011 | Dunne |
| 7,991,575 B2 | 8/2011 | Vogel |
| 8,016,676 B2 | 9/2011 | Carter |
| 8,125,329 B1 | 2/2012 | Hirou |
| 8,139,098 B2 | 3/2012 | Carter |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| D660,819 S | 5/2012 | Chen |
| 8,193,919 B2 | 6/2012 | Langer |
| 8,224,311 B2 | 7/2012 | Majmundar |
| 8,237,574 B2 | 8/2012 | Anderson |
| 8,334,656 B2 | 12/2012 | Weiss |
| 8,354,914 B2 | 1/2013 | Buckingham |
| 8,504,103 B2 | 8/2013 | Ficquette |
| D689,828 S | 9/2013 | Pierson |
| 8,562,158 B2 | 10/2013 | Chien |
| 8,565,399 B2 | 10/2013 | Siminoff |
| D692,847 S | 11/2013 | Barley |
| 8,630,452 B2 | 1/2014 | Mardirossian |
| 8,665,333 B1 | 3/2014 | Sharma |
| 8,669,876 B2 | 3/2014 | Anderson |
| D707,147 S | 6/2014 | Crippa |
| 8,780,201 B1 | 7/2014 | Scalisi |
| D710,727 S | 8/2014 | Siminoff |
| D710,728 S | 8/2014 | Siminoff |
| D711,275 S | 8/2014 | Scalisi |
| 8,823,795 B1 | 9/2014 | Scalisi |
| 8,842,180 B1 | 9/2014 | Kasmir |
| 6,875,208 B2 | 10/2014 | Abkairov |
| 8,866,598 B2 | 10/2014 | Collins |
| 8,872,915 B1 | 10/2014 | Scalisi |
| 8,937,659 B1 | 1/2015 | Scalisi |
| 8,941,736 B1 | 1/2015 | Scalisi |
| 8,947,530 B1 | 2/2015 | Scalisi |
| 8,953,040 B1 | 2/2015 | Scalisi |
| 8,976,244 B2 | 3/2015 | Felt |
| 9,013,575 B2 | 4/2015 | Scalisi |
| 9,021,134 B1 | 4/2015 | Patel |
| 9,049,352 B2 | 6/2015 | Scalisi |
| 9,053,622 B2 | 6/2015 | Scalisi |
| 9,055,202 B1 | 6/2015 | Scalisi |
| 9,057,210 B2 | 6/2015 | Dumas |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir |

(56) References Cited

U.S. PATENT DOCUMENTS

| | | |
|---|---|---|
| 9,071,923 B2 | 6/2015 | Zhang |
| 9,113,051 B1 | 8/2015 | Scalisi |
| 9,113,052 B1 | 8/2015 | Scalisi |
| 9,142,214 B2 | 9/2015 | Scalisi |
| 9,172,922 B1 | 10/2015 | Kasmir |
| 9,196,104 B2 | 11/2015 | Dumas |
| 9,218,696 B2 | 12/2015 | Dumas |
| 9,230,424 B1 | 1/2016 | Scalisi |
| 9,282,665 B1 | 3/2016 | Ladanyi |
| 9,336,637 B2 | 5/2016 | Neil |
| 9,338,594 B1 | 5/2016 | Onnen |
| 9,584,775 B2 | 2/2017 | Siminoff |
| 9,615,199 B1 | 4/2017 | Haney |
| D788,061 S | 5/2017 | Siminoff |
| D789,404 S | 6/2017 | Modestine |
| D789,820 S | 6/2017 | Siminoff |
| 9,674,433 B1 | 6/2017 | De La Cruz |
| D791,165 S | 7/2017 | Modestine |
| D791,240 S | 7/2017 | Lemberger |
| D791,241 S | 7/2017 | Lemberger |
| D791,243 S | 7/2017 | Loew |
| D791,878 S | 7/2017 | Loew |
| 9,697,723 B1 | 7/2017 | Ladanyi |
| 9,734,675 B2 | 8/2017 | Siminoff |
| D798,177 S | 9/2017 | Siminoff |
| 9,761,092 B2 | 9/2017 | Chen |
| 9,810,887 B1 | 11/2017 | Abdala |
| 9,978,260 B2 | 5/2018 | Lee |
| 10,289,917 B1 | 5/2019 | Fu |
| 10,367,814 B2 | 7/2019 | Walker |
| 2001/0010555 A1 | 8/2001 | Driscoll |
| 2001/0022627 A1 | 9/2001 | Bernhardt |
| 2002/0097161 A1 | 7/2002 | Deeds |
| 2003/0009364 A1 | 1/2003 | Miyoshi |
| 2003/0025599 A1 | 2/2003 | Monroe |
| 2003/0081952 A1 | 5/2003 | Geng |
| 2003/0169178 A1 | 9/2003 | Jensen |
| 2004/0085205 A1 | 5/2004 | Veh |
| 2004/0085449 A1 | 5/2004 | Millet |
| 2004/0086093 A1 | 5/2004 | Schranz |
| 2004/0095254 A1 | 5/2004 | Maruszczak |
| 2004/0117039 A1 | 6/2004 | Hantke |
| 2004/0178889 A1 | 9/2004 | Buckingham |
| 2004/0229569 A1 | 11/2004 | Franz |
| 2004/0257336 A1 | 12/2004 | Hershkovitz |
| 2005/0006528 A1 | 1/2005 | Movsesian |
| 2005/0007451 A1 | 1/2005 | Chiang |
| 2005/0040954 A1 | 2/2005 | McNally |
| 2005/0046584 A1 | 3/2005 | Breed |
| 2005/0057361 A1 | 3/2005 | Giraldo |
| 2005/0071879 A1 | 3/2005 | Haldavnekar |
| 2005/0097248 A1 | 5/2005 | Kelley |
| 2005/0116480 A1 | 6/2005 | Deng |
| 2005/0237208 A1 | 10/2005 | Wojcik |
| 2005/0259641 A1 | 11/2005 | Beninato |
| 2005/0267605 A1 | 12/2005 | Lee |
| 2005/0285934 A1 | 12/2005 | Carter |
| 2005/0285944 A1 | 12/2005 | Watanabe |
| 2006/0010504 A1 | 1/2006 | Sharma |
| 2006/0038663 A1 | 2/2006 | Steinetz |
| 2006/0063517 A1 | 3/2006 | Oh |
| 2006/0093187 A1 | 5/2006 | Mittal |
| 2006/0100002 A1 | 5/2006 | Luebke |
| 2006/0139449 A1 | 6/2006 | Cheng |
| 2006/0152365 A1 | 7/2006 | Kim |
| 2006/0156361 A1 | 7/2006 | Wang |
| 2006/0187034 A1 | 8/2006 | Styers |
| 2006/0195872 A1 | 8/2006 | Seo |
| 2006/0271678 A1 | 11/2006 | Jessup |
| 2006/0273895 A1 | 12/2006 | Kollin |
| 2007/0008081 A1 | 1/2007 | Tylicki |
| 2007/0012602 A1 | 1/2007 | Baldassari |
| 2007/0025712 A1 | 2/2007 | Jezierski |
| 2007/0029486 A1 | 2/2007 | Zhevelev |
| 2007/0046442 A1 | 3/2007 | Bartorelli |
| 2007/0052531 A1 | 3/2007 | Matthews |
| 2007/0066316 A1 | 3/2007 | Hoover |
| 2007/0103541 A1 | 5/2007 | Carter |
| 2007/0109441 A1 | 5/2007 | Cheng |
| 2007/0118831 A1 | 5/2007 | Kondo |
| 2007/0126574 A1 | 6/2007 | Langer |
| 2007/0132413 A1 | 6/2007 | Mays |
| 2007/0146115 A1 | 6/2007 | Roosli |
| 2007/0146122 A1 | 6/2007 | Ratner |
| 2007/0176778 A1 | 8/2007 | Ando |
| 2007/0194945 A1 | 8/2007 | Atkinson |
| 2007/0206510 A1 | 9/2007 | Morris |
| 2007/0216764 A1 | 9/2007 | Kwak |
| 2007/0237358 A1 | 10/2007 | Tseng |
| 2008/0004995 A1 | 1/2008 | Klingenberg |
| 2008/0028063 A1 | 1/2008 | Holmes |
| 2008/0036862 A1 | 2/2008 | Lang |
| 2008/0047287 A1 | 2/2008 | Ruppert |
| 2008/0128586 A1 | 6/2008 | Johnson |
| 2008/0129498 A1 | 6/2008 | Howarter |
| 2008/0129825 A1 | 6/2008 | DeAngelis |
| 2008/0136915 A1 | 6/2008 | Iwamura |
| 2008/0145050 A1 | 6/2008 | Mayer |
| 2008/0157936 A1 | 7/2008 | Ebrom |
| 2008/0157956 A1 | 7/2008 | Radivojevic |
| 2008/0167072 A1 | 7/2008 | Berstis |
| 2008/0198225 A1 | 8/2008 | Gal |
| 2008/0297339 A1 | 12/2008 | Mathews |
| 2009/0059002 A1 | 3/2009 | Kim |
| 2009/0072963 A1 | 3/2009 | Langer |
| 2009/0093235 A1 | 4/2009 | Grealish |
| 2009/0141939 A1 | 6/2009 | Chambers |
| 2009/0167862 A1 | 7/2009 | Jentoft |
| 2009/0207249 A1 | 8/2009 | Erel |
| 2009/0213208 A1 | 8/2009 | Glatt |
| 2009/0243852 A1 | 10/2009 | Haupt |
| 2009/0273670 A1 | 11/2009 | Tamayo |
| 2009/0284578 A1 | 11/2009 | Carter |
| 2009/0296641 A1 | 12/2009 | Bienas |
| 2009/0302995 A1 | 12/2009 | Park |
| 2009/0308116 A1 | 12/2009 | Lambrou |
| 2010/0087161 A1 | 4/2010 | Young |
| 2010/0103300 A1 | 4/2010 | Jones |
| 2010/0109903 A1 | 5/2010 | Carrick |
| 2010/0134072 A1 | 6/2010 | Neu |
| 2010/0141761 A1 | 6/2010 | McCormack |
| 2010/0195810 A1 | 8/2010 | Mota |
| 2010/0225455 A1 | 9/2010 | Claiborne |
| 2010/0245060 A1 | 9/2010 | Tylicki |
| 2010/0276570 A1 | 11/2010 | Moser |
| 2010/0289661 A1 | 11/2010 | Styers |
| 2011/0025852 A1 | 2/2011 | Tanaka |
| 2011/0028118 A1 | 2/2011 | Thomas |
| 2011/0074570 A1 | 3/2011 | Feldstein |
| 2011/0090085 A1 | 4/2011 | Belz |
| 2011/0121940 A1 | 5/2011 | Jones |
| 2011/0140845 A1 | 6/2011 | Sanders |
| 2011/0156566 A1 | 6/2011 | Chen |
| 2011/0207509 A1 | 8/2011 | Crawford |
| 2011/0221582 A1 | 9/2011 | Chuey |
| 2011/0260880 A1 | 10/2011 | Dean |
| 2011/0264405 A1 | 10/2011 | Vogel |
| 2011/0287718 A1 | 11/2011 | Abel |
| 2011/0313775 A1 | 12/2011 | Laligand |
| 2012/0011559 A1 | 1/2012 | Miettinen |
| 2012/0027248 A1 | 2/2012 | Feris |
| 2012/0030133 A1 | 2/2012 | Rademaker |
| 2012/0044049 A1 | 2/2012 | Vig |
| 2012/0044050 A1 | 2/2012 | Vig |
| 2012/0044085 A1 | 2/2012 | Hung |
| 2012/0085824 A1 | 4/2012 | Handshaw |
| 2012/0098439 A1 | 4/2012 | Recker |
| 2012/0105631 A1 | 5/2012 | Hutchings |
| 2012/0108215 A1 | 5/2012 | Kameli |
| 2012/0113253 A1 | 5/2012 | Slater |
| 2012/0127308 A1 | 5/2012 | Eldershaw |
| 2012/0162416 A1 | 6/2012 | Su |
| 2012/0182427 A1 | 7/2012 | Marshall |
| 2012/0200942 A1 | 8/2012 | Schmidt |

(56) References Cited

U.S. PATENT DOCUMENTS

| | | |
|---|---|---|
| 2012/0229282 A1 | 9/2012 | Zagami |
| 2012/0230203 A1 | 9/2012 | Casey |
| 2012/0230696 A1 | 9/2012 | Pederson |
| 2012/0262581 A1 | 10/2012 | Carter |
| 2012/0267962 A1 | 10/2012 | Hanchett |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0287123 A1 | 11/2012 | Starner |
| 2012/0293310 A1 | 11/2012 | Fitzgibbon |
| 2012/0320150 A1 | 12/2012 | Montgomery |
| 2012/0327225 A1 | 12/2012 | Barley |
| 2012/0327246 A1 | 12/2012 | Senior |
| 2013/0017812 A1 | 1/2013 | Foster |
| 2013/0020875 A1 | 1/2013 | Wozniak |
| 2013/0039499 A1 | 2/2013 | Patenaude |
| 2013/0045763 A1 | 2/2013 | Ruiz |
| 2013/0057695 A1 | 3/2013 | Huisking |
| 2013/0057696 A1 | 3/2013 | Felt |
| 2013/0091213 A1 | 4/2013 | Diab |
| 2013/0094444 A1 | 4/2013 | Lai |
| 2013/0128050 A1 | 5/2013 | Aghdasi |
| 2013/0130749 A1 | 5/2013 | Andersen |
| 2013/0136033 A1 | 5/2013 | Patil |
| 2013/0147616 A1 | 6/2013 | Lambert |
| 2013/0147964 A1 | 6/2013 | Frank |
| 2013/0169809 A1 | 7/2013 | Grignan |
| 2013/0169814 A1 | 7/2013 | Liu |
| 2013/0173477 A1 | 7/2013 | Cairns |
| 2013/0208123 A1 | 8/2013 | Lakhani |
| 2013/0223279 A1 | 8/2013 | Tinnakornsrisuphap |
| 2013/0223833 A1 | 8/2013 | Tenenbaum |
| 2013/0286211 A1 | 10/2013 | Cao |
| 2013/0293722 A1 | 11/2013 | Chen |
| 2013/0328522 A1 | 12/2013 | Brockman |
| 2013/0335219 A1 | 12/2013 | Malkowski |
| 2014/0009609 A1 | 1/2014 | Webster |
| 2014/0015967 A1 | 1/2014 | Moore |
| 2014/0070922 A1 | 3/2014 | Davis |
| 2014/0077929 A1 | 3/2014 | Dumas |
| 2014/0087780 A1 | 3/2014 | Abhyanker |
| 2014/0088761 A1 | 3/2014 | Shamlian |
| 2014/0118600 A1 | 5/2014 | Son |
| 2014/0125754 A1 | 5/2014 | Haywood |
| 2014/0149706 A1 | 5/2014 | Shim |
| 2014/0167676 A1 | 6/2014 | Mack |
| 2014/0188643 A1 | 7/2014 | Murphy |
| 2014/0210590 A1 | 7/2014 | Castro |
| 2014/0253725 A1 | 9/2014 | Hsu |
| 2014/0260449 A1 | 9/2014 | Uyeda |
| 2014/0265359 A1 | 9/2014 | Cheng |
| 2014/0266669 A1 | 9/2014 | Fadell |
| 2014/0266767 A1 | 9/2014 | Huang |
| 2014/0267716 A1 | 9/2014 | Child |
| 2014/0267740 A1 | 9/2014 | Almomani |
| 2014/0285672 A1 | 9/2014 | Hogasten |
| 2014/0292194 A1 | 10/2014 | Sagal |
| 2014/0292481 A1 | 10/2014 | Dumas |
| 2014/0320663 A1 | 10/2014 | Chien |
| 2014/0334684 A1 | 11/2014 | Strimling |
| 2014/0340894 A1 | 11/2014 | Chien |
| 2014/0368643 A1 | 12/2014 | Siegel |
| 2015/0022319 A1 | 1/2015 | Chutorash |
| 2015/0022618 A1 | 1/2015 | Siminoff |
| 2015/0022620 A1 | 1/2015 | Siminoff |
| 2015/0027178 A1 | 1/2015 | Scalisi |
| 2015/0029335 A1 | 1/2015 | Kasmir |
| 2015/0035987 A1 | 2/2015 | Fernandez |
| 2015/0049191 A1 | 2/2015 | Scalisi |
| 2015/0054949 A1 | 2/2015 | Scalisi |
| 2015/0061859 A1 | 3/2015 | Matsuoka |
| 2015/0063559 A1 | 3/2015 | Siminoff |
| 2015/0070495 A1 | 3/2015 | Scalisi |
| 2015/0077220 A1 | 3/2015 | Davis |
| 2015/0084779 A1 | 3/2015 | Saladin |
| 2015/0092055 A1 | 4/2015 | Scalisi |
| 2015/0109104 A1 | 4/2015 | Fadell |
| 2015/0109111 A1 | 4/2015 | Lee |
| 2015/0109112 A1 | 4/2015 | Fadell |
| 2015/0112885 A1 | 4/2015 | Fadell |
| 2015/0120015 A1 | 4/2015 | Fadell |
| 2015/0120598 A1 | 4/2015 | Fadell |
| 2015/0127712 A1 | 5/2015 | Fadell |
| 2015/0145991 A1 | 5/2015 | Russell |
| 2015/0156030 A1 | 6/2015 | Fadell |
| 2015/0156031 A1 | 6/2015 | Fadell |
| 2015/0161856 A1 | 6/2015 | Wilson |
| 2015/0163463 A1 | 6/2015 | Hwang |
| 2015/0179031 A1 | 6/2015 | Wallace |
| 2015/0185964 A1 | 7/2015 | Stout |
| 2015/0194839 A1 | 7/2015 | Wojcik |
| 2015/0208032 A1 | 7/2015 | Gavney |
| 2015/0211259 A1 | 7/2015 | Dumas |
| 2015/0213658 A1 | 7/2015 | Dumas |
| 2015/0228281 A1 | 8/2015 | Raniere |
| 2015/0236966 A1 | 8/2015 | Francini |
| 2015/0275564 A1 | 10/2015 | Rosenthal |
| 2015/0276266 A1 | 10/2015 | Warren |
| 2015/0309487 A1 | 10/2015 | Lyman |
| 2015/0310381 A1 | 10/2015 | Lyman |
| 2015/0312531 A1 | 10/2015 | Samad |
| 2015/0338812 A1 | 11/2015 | Miura |
| 2015/0339895 A1 | 11/2015 | Chen |
| 2015/0347910 A1 | 12/2015 | Fadell |
| 2016/0001719 A1 | 1/2016 | Frost |
| 2016/0019495 A1 | 1/2016 | Kolchin |
| 2016/0057199 A1 | 2/2016 | Aziz |
| 2016/0058181 A1 | 3/2016 | Han |
| 2016/0073479 A1 | 3/2016 | Erchak |
| 2016/0078699 A1 | 3/2016 | Kalb |
| 2016/0104061 A1 | 4/2016 | McGill |
| 2016/0105644 A1 | 4/2016 | Smith |
| 2016/0125357 A1 | 5/2016 | Hall |
| 2016/0171435 A1 | 6/2016 | Newton |
| 2016/0171439 A1 | 6/2016 | Ladden |
| 2016/0191864 A1 | 6/2016 | Siminoff |
| 2016/0219254 A1 | 7/2016 | Hu |
| 2016/0235236 A1 | 8/2016 | Byers |
| 2016/0247344 A1 | 8/2016 | Eichenblatt |
| 2016/0261425 A1 | 9/2016 | Horton |
| 2016/0292936 A1 | 10/2016 | Palmer |
| 2016/0300187 A1 | 10/2016 | Kashi |
| 2016/0307380 A1 | 10/2016 | Ho |
| 2016/0330403 A1 | 11/2016 | Siminoff |
| 2016/0366373 A1 | 12/2016 | Siminoff |
| 2017/0023780 A1 | 1/2017 | Braker |
| 2017/0064504 A1 | 3/2017 | Jose |
| 2017/0109984 A1 | 4/2017 | Child |
| 2017/0124510 A1 | 5/2017 | Catering |
| 2017/0149855 A1 | 5/2017 | Doshi |
| 2017/0160137 A1 | 6/2017 | Jeong |
| 2017/0160138 A1 | 6/2017 | Jeong |
| 2017/0160144 A1 | 6/2017 | Jeong |
| 2017/0162225 A1 | 6/2017 | Jeong |
| 2017/0163944 A1 | 6/2017 | Jeong |
| 2017/0220872 A1 | 8/2017 | Child |
| 2017/0251035 A1 | 8/2017 | Siminoff |
| 2017/0251173 A1 | 8/2017 | Siminoff |
| 2017/0251182 A1 | 8/2017 | Siminoff |
| 2017/0272706 A1 | 9/2017 | Jeong |
| 2017/0280112 A1 | 9/2017 | Siminoff |
| 2017/0280565 A1 | 9/2017 | Tso |
| 2017/0293883 A1 | 10/2017 | Li |
| 2017/0294694 A1 | 10/2017 | Tso |
| 2018/0019889 A1 | 1/2018 | Burns |

FOREIGN PATENT DOCUMENTS

| | | |
|---|---|---|
| CN | 1902609 B | 5/2010 |
| CN | 202872976 U | 4/2013 |
| CN | 202939738 U | 5/2013 |
| EP | 0684743 B1 | 11/1995 |
| GB | 2400958 B | 7/2005 |
| WO | 2001093220 A1 | 12/2001 |

(56) References Cited

FOREIGN PATENT DOCUMENTS

| WO | 2007111802 A2 | 10/2007 |
|---|---|---|
| WO | 2014062321 A1 | 4/2014 |
| WO | 2014107196 A1 | 7/2014 |
| WO | 2014144628 A2 | 9/2014 |
| WO | 2015023737 A1 | 2/2015 |
| WO | 2016032217 A1 | 3/2016 |

OTHER PUBLICATIONS

The Next Web—Hardware renaissance: A look at the Christie Street platform and doorbot video streaming doorbell—Downloaded on Nov. 18, 2013 from http://thenextweb.com/insider/2012/12/10/satisfaction-lies-in-hardware-for-siminoffs-christie-street-platform-and-doorbot-video-streaming-doorbell/; prior art publication at least as of Dec. 10, 2012.
Digital Trends—Doorbot wi-fi doorbell camera lets you see visitors on your smartphone—Downloaded on Nov. 18, 2013 from http://www.digitaltrends.com/lifestyle/doorbot-camera-see-visitors-smartphone/; prior art publication at least as of Dec. 9, 2012.
Doorbot website—Downloaded on Jul. 26, 2013 from http://www.getdoorbot.com.
Doorbot users manual—Downloaded on Nov. 18, 2013 from http://static.mydoorbot.com/DoorBot%20Users%20Manual%201.0.pdf.
Doorbot "fact sheet"—Downloaded on Nov. 18, 2013 from http://cdn.shopify.com/s/files/1/0247/6501/files/DoorBotMediaKit.pdf?17037.
CellNock—Index page—Originally downloaded on Sep. 23, 2013 from http://cellnock.com/index.html; The website says CellNock is "patent pending".
CellNock website—downloaded on Nov. 18, 2013 from http://cellnock.com/; The website says CellNock is "patent pending".
Philips InSight Baby Monitor—Originally downloaded on Jul. 24, 2013 from http://www.amazon.com/Philips-B120-37-InSight-Wireless/dp/B00AALO9Z6/ref=sr_1_3?ie=UTF8&qid=1384808431&sr=8-3&keywords=philips+insight.
SkyBell—MySkyBell.com (previously iDoorCam.com)—Downloaded on Nov. 18, 2013 from http://www.myskybell.com/.
Squariiz IDS Doorbell System—Downloaded on Aug. 15, 2013 from http://www.indiegogo.com/projects/squaritz-ds-intelligent-doorbell-system.
MyBells—Downloaded on Nov. 18, 2013 from http://www.indiegogo.com/projects/mybells-the-smart-bells.
Wireless Video Doorbell Pager—Downloaded on Aug. 9, 2013 from http://www.indiegogo.com/projects/wireless-video-doorbell-pager-4.
Lockitron—Downloaded on Jul. 24, 2013 from https://lockitron.com/preorder.
Eyetalk for Home—Downloaded May 24, 2013 from http://www.revolutionaryconceptsinc.com/forhome.html.
Smartbell—Downloaded on Dec. 5, 2013 from http://smartbell.co/.
Smartbell—A Doorbell for Smartphones, published by Scrambled Brains Tech, LLC., Oct. 1, 2013.
August Smart Lock—Downloaded on Jun. 10, 2014 from www.August.com.
August Smart Lock—Downloaded on Oct. 10, 2014 from www.August.com.
Kevo Lock—User guide—Downloaded on Jun. 10, 2014 from http://s7d5.scene7.com/is/content/BDHHI/Kwikset/Website%20Content/Kevo/kevo-userguide-kwikset_eng.pdf.
Kevo Lock—Installation guide—Downloaded on Oct. 10, 2014 from http://s7d5.scene7.com/is/content/BDHHI/Kwikset/Website%20Content/Kevo/installation_guide.pdf.
Schlage Electronic Lock—User guide—Downloaded on Jun. 10, 2014 from www.schlage.com.
AdaFruit—Lock-Style Solenoid—Downloaded on Aug. 22, 2014 from www.AdaFruit.com.
Wikipedia—Power Matters Alliance—Downloaded on Aug. 23, 2014 from www.wikipedia.com.
AdaFruit—Push-Pull Solenoid—Technical Details—Downloaded on Aug. 22, 2014 from www.AdaFruit.com.
Wikipedia—Qi—Downloaded on Aug. 23, 2014 from www.wikipedia.com.
TP-Link—Website—Downloaded on Jul. 15, 2014 from www.tp-link.US.
A HD Cameras—AC Adapter Spy Camera—Downloaded on Jun. 24, 2014 from ahdcameras.com.
Fanfare Chime—Downloaded on Oct. 10, 2014 from https://www.kickstarter.com/projects/1040187373/1919517395?token=47099d90.
Ring Video Doorbell—Downloaded on Oct. 10, 2014 from www.ring.com.
Tech Crunch—Doorboot becomes Ring—Downloaded on Oct. 10, 2014 from http://techcrunch.com/2014/09/29/doorbot-ring-home-security-doorbell/?ncid=rss&utm_source=feedburner&utm_medium=feed&utm_campaign=Feed.
IChime—iChime Customizable Digital Chime System—Downloaded on Nov. 7, 2014 from http://www.ichime.com/.
Christie Street—Doorbot—Downloaded on Jun. 14, 2013 from https://christiestreet.com/products/doorbot.
IDoorcam—A Wi-Fi Enabled, Webcam Doorbell—Downloaded on Sep. 3, 2013 from http://www.idoorcam.com/.
Langer—Langer Doorbell Button Sized Light—Downloaded on Sep. 16, 2013 from http://www.youtube.com/watch?v=u9nNCm4tSYI.
Langer—Langer Doorbell Light—Downloaded on Sep. 16, 2013 from http://www.youtube.com/watch?v=6dbU-Gyjgx8.
SmartBell—SmartBell on Kickstarter—Downloaded on Feb. 28, 2014 from http://www.kickstarter.com/projects/1256599792/smartbell-wi-fi-doorbell-for-video-chats-to-ios-an.
DefenDoor—DefenDoor by Glate LLC—Downloaded on Dec. 11, 2014 from https://www.kickstarter.com/projects/85455040/defendoor-a-home-secunty-system-that-syncs-with-y.
CNET—Notifi by Chamberlain—Downloaded on Jan. 9, 2015 from http://www.cnet.com/products/chamberlain-notifi-video-door-chime/.
I-Bell—Downloaded on Jan. 13, 2015 from https://www.kickstarter.com/projects/729057054/i-bell.
Dropcam—Downloaded on Jan. 19, 2015 from https://www.dropcam.com/dropcam-pro.
Doorbird—Downloaded on Jan. 23, 2015 from http://www.doorbird.com/.
Chui Doorbell—Downloaded on Jan. 23, 2015 from http://www.getchui.com/.
Tech Crunch—Chui Doorbell—Downloaded on Jan. 23, 2015 from http://techcrunch.com/2014/04/18/214-technologies-is-crowdfunding-a-smart-doorbell-called-chui/.
Giz Mag—Downloaded on Jan. 23, 2015 from http://www.gizmag.com/gopano-micro-captures-360-degree-video-on-iphone/18542/.
Sengled Snap Light Camera—Downloaded on Mar. 9, 2015 from http://www.sengled.com/product/snap.
CNET—Alarm.com Garage Door Camera—Downloaded on Mar. 9, 2015 from http://www.cnet.com/au/products/alarm-com-for-apple-watch/.
Rollup iHome Peephole Doorbell—Downloaded on May 7, 2015 from http://www.rollupcn.com.
Tech Crunch—Ring Chime—Smart Chime—Downloaded on May 13, 2015 from http://techcrunch.com/2015/05/13/rings-smart-doorbell-gets-a-smart-speaker/#.y0xlqx:SpqY.
Peeple—Peephole Camera—Downloaded on May 14, 2015 from https://www.kickstarter.com/projects/1544392549/peeple-caller-id-for-your-front-door/video_share.
Vivant Doorbell Camera—Downloaded on May 20, 2015 from http://www.vivint.com/company/newsroom/press/Vivint-Introduces-Wi-Fi-Enabled-Doorbell-Camera-into-Its-Smart-Home-Platform.
MyIntercom Video System—Downloaded on Jun. 8, 2015 from http://myintercom.de/en/funktionsweise.
Kocchl's Cobell Wi-Fi Doorbell—Downloaded on Sep. 14, 2015 from http://www.kocchis.com/Cobell_Manual.pdf.
August Doorbell Cam—Downloaded on Nov. 12, 2015 from http://august.com/products/august-doorbell/.
Nest Home Index—Downloaded on Nov. 12, 2015 from https://nest.com/blog/2015/11/09/the-first-nest-home-index/?utm_medium=

(56) References Cited

OTHER PUBLICATIONS paid%20social&utm_source=Facebook&utm_campaign=Nest%20Home%20Index&utm_content=Launch%20post.
Engadget—Amazon partners are reportedly exploring in-home deliveries—Downloaded on Oct. 19, 2017 from https://www.engadget.com/2016/09/27/amazon-august-garageio-inhome/; prior art publication at least as of Sep. 27, 2016.
Logittech—Logitech Circle 2—Downloaded on Oct. 19, 2017 from from https://www.logitech.com/en-us/product/circle-2-home-security-camera; prior art publication at least as of Jul. 26, 2017.
NY Times—Was That an Intruder or a Pet? The Security Cams That Can Tell—Downloaded on Oct. 19, 2017 from https://www.nytimes.com/2017/08/09/technology/personaltech/internet-connected-security-cameras-wirecutter.html?rref=collection%2Fsectioncollection%2Fpersonaltech; prior art publication at least as of Aug. 10, 2017.
Wisenet—SmartCam D1—Downloaded on Oct. 19, 2017 from http://www.wisenetlife.com/en-us/product/SmartCam/SNH-V6435DN;jsessionid=023065D418C9E9CA7335F6D9B4E2C8DC/faq/?currtPg=4; prior art publication at least as of Sep. 23, 2017.
Nortek Control—Go Control: Smart Doorbell Camera—Downloaded on Oct. 19, 2017 from https://www.nortekcontrol.com/pdf/literature/GC-DBC-1-GoControl-Smart-Doorbell-Camera-Spec-Sheet.pdf; prior art publication at least as of Dec. 18, 2016.
HSN—Samsung SmartCam High-Definition Video Doorbell—Downloaded on Oct. 25, 2017 from https://www.hsn.com/products/samsung-smartcam-high-definition-video-doorbell/8534791; prior art publication at least as of Oct. 22, 2017.
Wirecutter—The Best Smart Doorbell Camera—Downloaded on Oct. 25, 2017 from https://thewirecutter.com/reviews/best-smart-doorbell-camera/; prior art publication at least as of Oct. 19, 2017.
Newsday—Google's Nest launches video doorbell, new security system—Downloaded on Oct. 25, 2017 from https://www.newsday.com/lifestyle/google-s-nest-launches-video-doorbell-new-security-system-1.14498694; prior art publication at least as of Oct. 18, 2017.
ZD Net—Amazon to develop a smart doorbell to deliver packages inside your home—Downloaded on Oct. 25, 2017 from http://www.zdnet.com/article/amazon-plans-to-develop-smart-doorbell-to-deliver-packages-inside-your-home/; prior art publication at least as of Oct. 11, 2017.
Dealerscope—Petra Named Exclusive Distributor for New Uniden U-Bell DB1 Wireless Video Doorbell—Downloaded on Oct. 25, 2017 from http://www.dealerscope.com/article/petra-named-exclusive-distributor-new-uniden-u-bell-db1-wireless-video-doorbell/; prior art publication at least as of Oct. 3, 2017.
Nest—Say hello to Nest Hello—Downloaded on Oct. 25, 2017 from https://nest.com/blog/2017/09/20/say-hello-to-nest-hello/?utm_campaign=nest%20hello%20preannounce&utm_source=nest%20customers&utm_medium=m-email&utm_content=learn%20more; prior art publication at least as of Sep. 27, 2017.
Gate: Your Personal Doorman—Downloaded on Oct. 25, 2017 from https://www.indiegogo.com/projects/gate-your-personal-doorman#/; prior art publication at least as of Sep. 25, 2017.
Mashable—Walmart is teaming with a smart lock startup to deliver food straight to your fridge—Downloaded on Oct. 25, 2017 from http://mashable.eom/2017/09/24/walmart-smart-lock-grocery-delivery/#7b0i0W4L_mqf; prior art publication at least as of Sep. 24, 2017.
Wired—Review: August Smart Lock—Downloaded on Oct. 25, 2017 from https://www.wired.com/2017/09/review-august-smart-lock/; prior art publication at least as of Sep. 24, 2017.
Amazon—Amazon Key—Downloaded on Oct. 25, 2017 from https://www.amazon.com/b?ie=UTF8&node=17285120011.
Amazon—Amazon Key In-Home Kit includes: Amazon Cloud Cam (Key Edition) indoor security camera and compatible smart lock—Downloaded on Oct. 25, 2017 from https://www.amazon.com/dp/B00KCYQGXE?locationCheckInvoked=1.
Amazon—Amazon Cloud Cam Indoor Security Camera, works with Alexa—Downloaded on Oct. 25, 2017 from https://www.amazon.com/Amazon-Cloud-Indoor-Security-Camera/dp/B01C4UY0JK/ref=sr_tr_1?s=amazon-devices&ie=UTF8&qid=1508945752&sr=1-1&keywords=amazon+cloud+cam.
Best Buy—Vivint Smart Home—Downloaded on Oct. 25, 2017 from https://www.bestbuy.com/site/home-security-solutions/smart-home/pcmcat748302047019.c?id=pcmcat748302047019&ref=P30T29R169&loc=BODY&CampaignID=860152&eut=2387920889; prior art publication at least as of Aug. 25, 2017.
Ring—Chime Pro—Downloaded on Oct. 25, 2017 from https://ring.com/chime-pro; prior art publication at least as of Aug. 23, 2017.
Twice—Samsung Wisenet SmartCam D1 Video Doorbell—Downloaded on Oct. 25, 2017 from http://www.twice.com/news/smart-home/samsung-wisenet-smartcam-d1-video-doorbell/65643; prior art publication at least as of Jul. 31, 2017.
Tech Crunch—Ring adds three connected Spotlight Cams to its Floodlight Cam lineup—Downloaded on Oct. 25, 2017 from https://techcrunch.com/2017/07/31/ring-adds-three-connected-spotlight-cams-to-its-floodlight-cam-lineup/; prior art publication at least as of Aug. 2, 2017.
CNBC—This $200 'smart' doorbell will show you who (or what) is in front of your house at all times—Downloaded on Oct. 25, 2017 from https://www.cnbc.com/2017/07/23/ring-doorbell-2-review.html; prior art publication at least as of Jul. 23, 2017.
Zmodo—Greet Pro with Beam Alert—Downloaded on Oct. 25, 2017 from http://www.zmodo.com/greetpro-1080p-wifi-video-doorbell/.
August—August Doorbell Cam Pro—Downloaded on Oct. 25, 2017 from http://august.com/products/doorbell-camera/?utm_source=Owners+from+Salesforce&utm_campaign=83b33655ed-EMAIL_CAMPAIGN_2017_06_06&utm_medium=email&utm_term=0_15a5cc0eb8-83b33655ed-247286221&mc_cid=83b33655ed&mc_eid=9d1996d140; prior art publication at least as of Jun. 11, 2017.
ATT—August Wi-Fi Doorbell Cam—Downloaded on Oct. 25, 2017 from https://m.att.com/shopmobile/accessories/specialty-items/August_Wi-Fi_Doorbell_Cam/_jcr_content.html?referrer=https%253A%2F%2Fwww.google.com%2F; prior art publication at least as of Jun. 9, 2017.
Ding, a beautifully simple smart doorbell—Downloaded on Oct. 25, 2017 from https://www.indiegogo.com/projects/ding-a-beautifully-simple-smart-doorbell-home-technology#/; prior art publication at least as of Jun. 5, 2017.
Clare Controls—The Clare Video Doorbell—Downloaded on Oct. 25, 2017 from https://www.clarecontrols.com/video-doorbell; prior art publication at least as of Jun. 1, 2017.
Business Insider—The best security cameras you can buy for your home—Downloaded on Oct. 25, 2017 from http://www.businessinsider.com/best-security-camera-home/#the-best-home-security-camera-for-outdoors-and-indoors-2; prior art publication at least as of May 27, 2017.
Smanos—Smart Video Doorbell—Downloaded on Oct. 25, 2017 from http://www.smanos.com/doorbell; prior art publication at least as of May 22, 2017.
Ring—Products—Downloaded on Oct. 30, 2017 from https://ring.com/.
Honeywell RCWL105A1003/N Plug-in Wireless Doorbell / Door Chime and Push Button; Downloaded on Apr. 16, 2019 from https://www.amazon.com/Honeywell-RCWL105A1003-Plug-Wireless-Button/dp/B001G0MATM; Prior art at least as of Sep. 26, 2008.
Sado Tech Model C Wireless Doorbell Operating at over 500-feet Range with Over 50 Chimes, No Batteries Required for Receiver; Downloaded on Apr. 16, 2019 from https://www.amazon.com/SadoTech-Wireless-Doorbell-Operating-Batteries/dp/B00FR4YQYK; Prior art at least as of Oct. 10, 2013.
Zheludev; The life and times of the LED—a 100-year history; Nature Photonics; Apr. 2007, pp. 189-192; vol. 1; Nature Publishing Group; Retrieved Apr. 16, 2019.
Yam; Innovative Advances in LED Technology; Microelectronics journal; Nov. 9, 2004; pp. 129-137; vol. 36; Retrieved Apr. 16, 2019.
Perkin Elmer; LHi968—LHi 968 Dual Element Detector, Top Line; Prior art at least as of Mar. 18, 2007.
Perkin Elmer; Pyroelectric Infrared Detectors; Prior art at least as of Apr. 16, 2009.

(56) References Cited

OTHER PUBLICATIONS

Perkin Elmer; Dual Element Detector; Prior art at least as of Mar. 25, 2007.
IEEE Standards Association; IEEE 802.15.1-2002—IEEE Standard for Telecommunications and Information Exchange Between Systems—LAN/MAN—Specific Requirements—Part 15: Wireless Medium Access Control (MAC) and Physical Layer (PHY) Specifications for Wireless Personal Area Networks (WPANs); Downloaded on Apr. 29, 2019 from https://standards.ieee.org/standard/802_15_1-2002.html; Prior art at least as of Jun. 14, 2002.
Bluetooth—Our History; Prior art least as of Oct. 17, 2013.
Nutone—LA600WH Door Chime—Installation & Operating Instructions; Downloaded on Apr. 29, 2019 from http://www.nutone.com/common/productDigitalAssethandler.ashx?id=5b25a40a-c56f-44bf-99d1-5b0c17f266e9; Prior art at least as of Sep. 18, 2013.
Nutone; LA600WH Universal Wired/Wireless MP3 Doorbell Mechanism, 6"w×9-1/2"h×2-1/4"d in White; Downloaded on Apr. 29, 2019 from http://www.nutone.com/products/product/e2562b0e-4fe5-432a-ac70-228953b19875; Prior art at least as of May 30, 2013.
InTune; InTune MP3 Door Chime Manual; Downloaded on Apr. 29, 2019 from https://www.heath-zenith.com/system/spree/documents/attachments/000/000/839/original/205371-02A.pdf?1436551434 ; Prior art at least as of 2013.
Nutone; College Pride Mechanism; Prior art at least as of Jun. 8, 2013.
Seco-Larm; Enforcer DP-236Q Wireless Video Door Phone Manual; Downloaded on Apr. 29, 2019 from http://www.seco-larm.com/image/data/A_Documents/02_Manuals/MiDP-236Q_150528.pdf.
CNIPA—China National Intellectual Property Administration; Notification of the Third Office Action of CN Application No. IIE151535; dated Nov. 15, 2019.

GARAGE DOOR COMMUNICATION SYSTEMS AND METHODS

CROSS-REFERENCE TO RELATED APPLICATIONS

The entire contents of U.S. Non-Provisional patent application Ser. No. 15/293,334; filed Oct. 14, 2016; and entitled GARAGE DOOR COMMUNICATION SYSTEMS AND METHODS are incorporated by reference herein.

The entire contents of U.S. Non-Provisional patent application Ser. No. 15/060,332; filed Mar. 3, 2016; and entitled GARAGE DOOR COMMUNICATION SYSTEMS AND METHODS are incorporated by reference herein.

The entire contents of U.S. Provisional Patent Application No. 62/129,814, filed Mar. 7, 2015; and entitled GARAGE DOOR COMMUNICATION SYSTEMS AND METHODS are incorporated by reference herein.

The entire contents of U.S. Nonprovisional patent application Ser. No. 14/861,613, filed Sep. 22, 2015; and entitled DOORBELL COMMUNICATION SYSTEMS AND METHODS are incorporated by reference herein.

BACKGROUND

Field

Various embodiments disclosed herein relate to devices and methods that enable remotely located individuals to operate assets located at another location.

Description of Related Art

Doorbells can enable a person located outside of an entry point, such as a door, to alert a person inside of an entry point that someone outside would like to talk to someone inside. Doorbells sometimes include a button located near a door, such as a front door, side door, or back door of a home, office, dwelling, warehouse, building, or structure. Doorbells are sometimes used near a gate or some other entrance to a partially enclosed area. Pushing the doorbell sometimes causes a chime or other alerting sound to be emitted.

Some devices may enable a user to communicate with and operate a device at another location, such as lights and air conditioning.

SUMMARY

In several embodiments a security system may comprise, among other things, an electronic doorbell, an electronic garage door controller, and a remote computing device. The electronic doorbell may comprise a first camera configurable to capture an image of a first zone, a button configurable to enable a visitor to sound an electronic chime, and a first microphone configurable to capture sounds. The electronic garage door controller may be communicatively coupled to the electronic doorbell. The electronic garage door controller may be directly or indirectly communicatively coupled to the electronic doorbell. The electronic garage door controller may comprise a second camera configurable to capture an image of a second zone, and a second microphone configurable to capture sounds. The remote computing device may be communicatively coupled to at least one of the electronic doorbell and the electronic garage door controller. The remote computing device may be directly or indirectly communicatively coupled to the electronic doorbell, the electronic garage door controller, or both. The remote computing device may be configurable to display at least one of the image of the first zone and the image of the second zone.

In some embodiments, the first zone may comprise an area adjacent a door of a building. The second zone may comprise an area located at least partially within a garage. The remote computing device may be configurable to run a software application comprising executable instructions that when executed, cause the security system to effectuate operations. Operations may comprise displaying, by a screen of the remote computing device, the image of the first zone. Operations may comprise receiving, by the remote computing device, an input from a user to open a garage door associated with the electronic garage door controller. Operations may comprise in response to receiving the input to open the garage door, displaying, by the screen of the remote computing device, the image of the second zone. The executable instructions may cause the security system to effectuate operations further comprising opening, by a garage door opener coupled to the electronic garage door controller, the garage door in response to receiving the input to open the garage door.

In some embodiments the remote computing device may be configurable to run a software application. The software application may comprise executable instructions that when executed, cause the security system to effectuate operations. The operations may comprise displaying, by a screen of the remote computing device, the image of the first zone. The operations may comprise receiving, by the security system, an indication the visitor is moving from the first zone towards the second zone. The operations may comprise in response to receiving the indication that the visitor is moving from the first zone towards the second zone, displaying, by the screen of the remote computing device, the image of the second zone.

In several embodiments, the indication may comprise at least one of global position system data, a wireless connectivity signal between the electronic doorbell and a remote computing device of the visitor, and a motion detected by a motion detector of the electronic doorbell.

In several embodiments the remote computing device may be configurable to run a software application comprising executable instructions that when executed, cause the security system to effectuate operations. Effectuating operations may include displaying, by a screen of the remote computing device, the image of the first zone. Effectuating operations may include determining, by at least one of the first camera and the security system, whether the visitor is located within the first zone. Effectuating operations may include, in response to determining that the visitor is not located within the first zone, displaying, by the screen of the remote computing device, the image of the second zone. The remote computing device may be configurable to run a software application comprising executable instructions that when executed, may cause the security system to effectuate operations. The operations may comprise displaying, by a screen of the remote computing device, the image of the first zone. The operations may comprise determining, by at least one of the second camera and the security system, whether the visitor is located within the second zone. The operations may comprise in response to determining that the visitor is located within the second zone, displaying, by the screen of the remote computing device, the image of the second zone. The remote computing device may be configurable to run a software application comprising executable instructions that when executed, cause the security system to effectuate operations. Operations may comprise displaying, by a screen of the remote computing device, the image of the first zone. Operations may comprise capturing, by the first microphone, a first sound and a second sound that occurs after the first sound. Operations may comprise determining, by the security system, whether the second sound is quieter than the first sound and whether the second sound is less than a predetermined threshold. Operations may comprise in response to determining that the second sound is quieter than the first sound and that the second sound is less than the predetermined threshold, displaying, by the screen of the remote computing device, the image of the second zone.

In several embodiments the remote computing device is configurable to run a software application comprising executable instructions that when executed, cause the security system to effectuate operations. Operations may comprise displaying, by a screen of the remote computing device, the image of the first zone. Operations may comprise capturing, by both the first microphone and the second microphone, a sound. Operations may comprise determining, by the security system, whether the sound is greater with respect to one of the first microphone and the second microphone. Operations may comprise in response to determining that the sound is greater with respect to the second microphone than the first microphone, displaying, by the screen of the remote computing device, the image of the second zone. The remote computing device may be configurable to run a software application comprising executable instructions that when executed, cause the security system to effectuate operations. The operations may comprise displaying, by a screen of the remote computing device, the image of the first zone. Operations may comprise capturing, by both the first microphone and the second microphone, a sound. Operations may comprise determining, by the security system, whether the sound is greater with respect to one of the first microphone and the second microphone. Operations may comprise in response to determining that the sound is greater with respect to the first microphone than the second microphone, continuing to display, by the screen of the remote computing device, the image of the first zone. The remote computing device is configurable to run a software application comprising executable instructions that when executed, cause the security system to effectuate operations. Operations may comprise displaying, by a screen of the remote computing device, the image of the first zone. Operations may comprise determining, by the security system, a location of the visitor. Operations may comprise in response to determining that the location of the visitor is at least one of outside of the first zone and moving towards the second zone, displaying, by the screen of the remote computing device, the image of the second zone.

Several embodiments may include a method of using a security system comprising an electronic doorbell. The electronic doorbell may have a first camera configurable to capture an image of a first zone, a button configurable to enable a visitor to sound an electronic chime, and a first microphone configurable to capture sounds. The security system may comprise an electronic garage door controller communicatively coupled to the electronic doorbell. The garage door controller may be directly or indirectly communicatively coupled to the electronic doorbell. The electronic garage door controller may comprise a second camera configurable to capture an image of a second zone, and a second microphone configurable to capture sounds. The security system may comprise a remote computing device communicatively coupled to at least one of the electronic doorbell and the electronic garage door controller. The remote computing device may be directly or indirectly communicatively coupled to the electronic doorbell, to the electronic garage door opener, or both. The method may comprise displaying, by a screen of the remote computing device, the image of the first zone. The method may comprise receiving, by the security system, an indication comprising one of the visitor moving from the first zone towards the second zone and the user authorizing the visitor to access the second zone. The method may comprise displaying, by the screen of the remote computing device, the image of the second zone in response to receiving the indication.

In some embodiments the first zone may comprise an area adjacent a door of a building, and the second zone may comprise an area located at least partially within a garage. The indication may comprise an input from a user to open a garage door associated with the electronic garage door controller. The method may comprise opening, by a garage door opener coupled to the electronic garage door controller, the garage door in response to receiving the input to open the garage door. Receiving, by the security system, the indication may comprise detecting, by a second motion detector located remote with respect to the electronic doorbell and the electronic garage door controller, a motion of the visitor. In response to receiving the indication that one of the visitor is moving from the first zone towards the second zone and the user authorizing the visitor to access the second zone, the method may include entering, by the first camera of the electronic doorbell, a camera sleep mode whereby the first camera does not capture images. In response to receiving the indication that one of the visitor is moving from the first zone towards the second zone and the user authorizing the visitor to access the second zone, the method may include entering, by the second camera of the electronic garage door controller, a camera live view mode whereby the second camera captures images.

In some embodiments the indication comprises a predetermined motion from the visitor.

BRIEF DESCRIPTION OF THE DRAWINGS

These and other features, aspects, and advantages are described below with reference to the drawings, which are intended to illustrate, but not to limit, the invention. In the drawings, like reference characters denote corresponding features consistently throughout similar embodiments.

DETAILED DESCRIPTION

Although certain embodiments and examples are disclosed below, inventive subject matter extends beyond the specifically disclosed embodiments to other alternative embodiments and/or uses, and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components.

For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

High-Level Overview

Garage door communication systems can provide a secure and convenient way for a remotely located individual to open, close, partially open, and/or partially close a garage door. As well, the garage door communication system can provide the remotely located individual with information about the garage door and the surrounding area. For example, the garage door communication system can allow the individual to determine whether the garage door is open, closed, partially open, partially closed, and/or moving between one of the positions (e.g. moving from a closed position to an open position). It should be appreciated that the garage door can move between any position, such as an open position, closed position, partially open position, and/or a partially closed position. In this manner, the garage door 927 can move with respect to a garage door frame 931.

The garage door communication system can use a computing device to enable a remotely located person to see, hear, and/or talk with visitors. Computing devices can include computers, laptops, tablets, mobile devices, smartphones, cellular phones, and wireless devices (e.g., cars with wireless communication). Example computing devices include the iPhone, iPad, iMac, MacBook Air, and MacBook Pro made by Apple Inc. Communication between a remotely located person and a visitor can occur via the Internet, cellular networks, telecommunication networks, and wireless networks.

Figure 1:
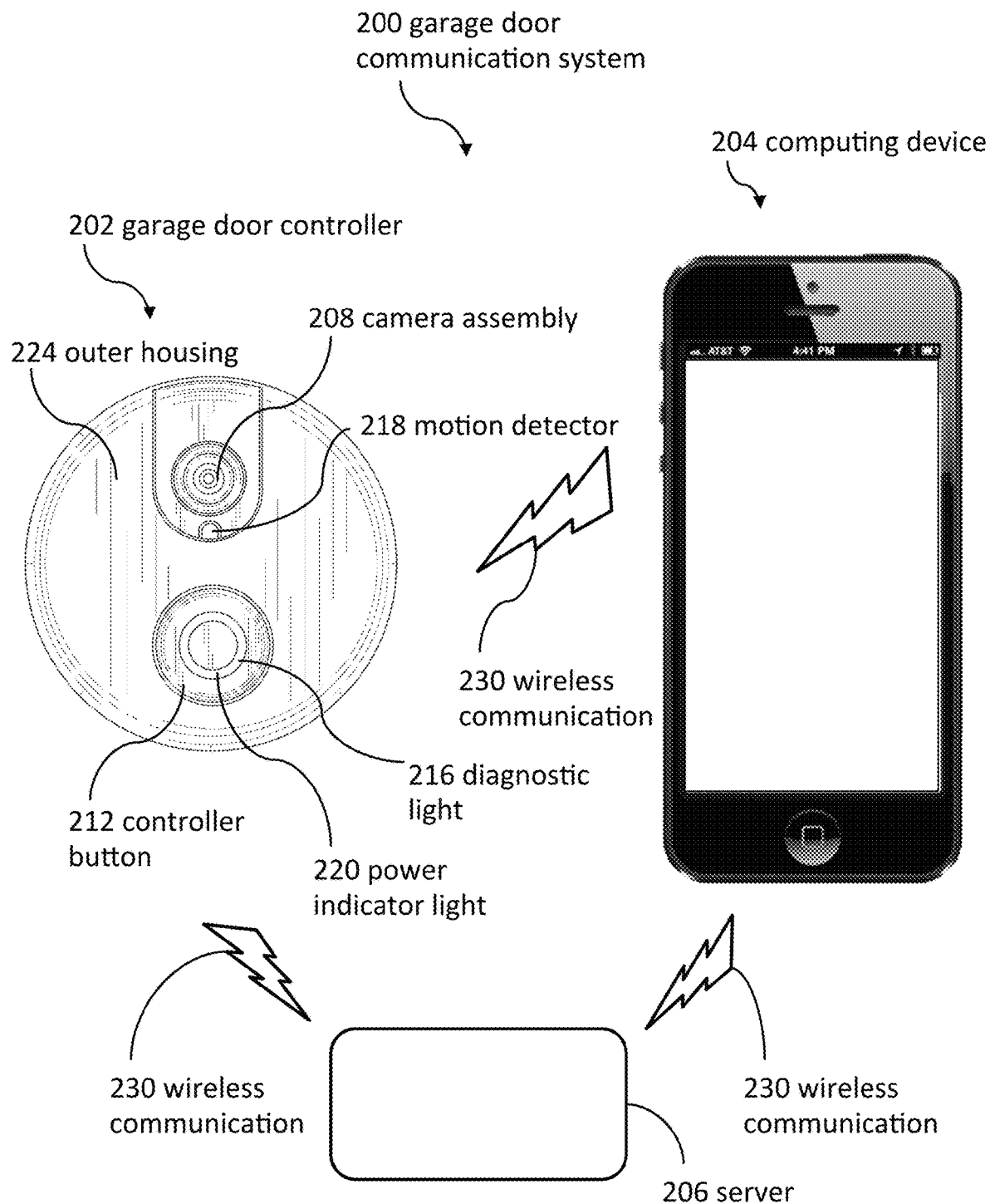
FIG. 1 illustrates a front view of a garage door communication system, according to some embodiments.

FIG. 1 illustrates a front view of a garage door communication system embodiment. The garage door communication system 200 can include a garage door controller 202 and a computing device 204. Although, the illustrated garage door controller 202 includes many components in one housing, several garage door communication system embodiments include components in separate housings.

The garage door controller 202 can include a camera assembly 208 and a controller button 212. The camera assembly 208 can be a video camera, which in some embodiments is a webcam. The camera assembly 208 can thereby allow the remotely located individual to view the garage door and the area surrounding the garage door, such as the inside of the garage and/or the exterior space around the garage door. While not shown in FIG. 1, the garage door communication system 200 can include a microphone and a speaker to allow the remotely located individual to hear, see, and talk with visitors who approach at least a portion of the garage door communication system 200 and/or press a controller button 212.

The garage door communication system 202 can include a diagnostic light 216 and a power indicator light 220. In some embodiments, the diagnostic light 216 is a first color (e.g., blue) if the garage door controller 202 and/or the garage door communication system 200 is connected to a wireless Internet network and is a second color (e.g., red) if the garage door controller 202 and/or the garage door communication system 200 is not connected to a wireless Internet network. In some embodiments, the power indicator light 220 is a first color if the garage door controller 202 is connected to a power source. The power source can be power supplied by the building to which the garage door controller 202 is attached. In some embodiments, the power indicator light 220 is a second color or does not emit light if the garage door controller 202 is not connected to the power source.

The garage door controller 202 can include an outer housing 224, which can be water resistant and/or waterproof. The outer housing can be made from metal or plastic, such as molded plastic with a hardness of 60 Shore D. In some embodiments, the outer housing 224 is made from brushed nickel or aluminum.

Rubber seals, not shown in FIG. 1, can be used to make the outer housing 224 water resistant or waterproof. The garage door controller 202 can be electrically coupled to a power source, such as wires electrically connected to a building's electrical power system. In some embodiments, the garage door controller 202 includes a battery for backup and/or primary power.

While not shown in FIG. 1, the garage door controller 202 may also include a light located adjacent an outer surface of an outer housing of the garage door controller 202. The light may be configured to illuminate an area adjacent the garage door controller 202, perhaps to light the way for a user to see the area. In some embodiments, the light may be selected from the group consisting of a light emitting diode, infrared light, halogen light, and fluorescent light.

Wireless communication 230 can enable the garage door controller 202 to communicate with the computing device 204. Some embodiments enable communication via cellular and/or WiFi networks. Some embodiments enable communication via the Internet. Several embodiments enable wired communication between the garage door controller 202 and the computing device 204. The wireless communication 230 can include the following communication means: radio, WiFi (e.g., wireless local area network), cellular, Internet, Bluetooth, telecommunication, electromagnetic, infrared, light, sonic, and microwave. Other communication means are used by some embodiments. In some embodiments, such as embodiments that include telecommunication or cellular communication means, the garage door controller 202 can initiate voice calls or send text messages to a computing device 204 (e.g., a smartphone, a desktop computer, a tablet computer, a laptop computer).

Some embodiments include computer software (e.g., application software), which can be a mobile application designed to run on smartphones, tablet computers, and other mobile devices. Software of this nature is sometimes referred to as "app" software. Some embodiments include software designed to run on desktop computers and laptop computers.

Software/User Interface Overview

Figure 2:
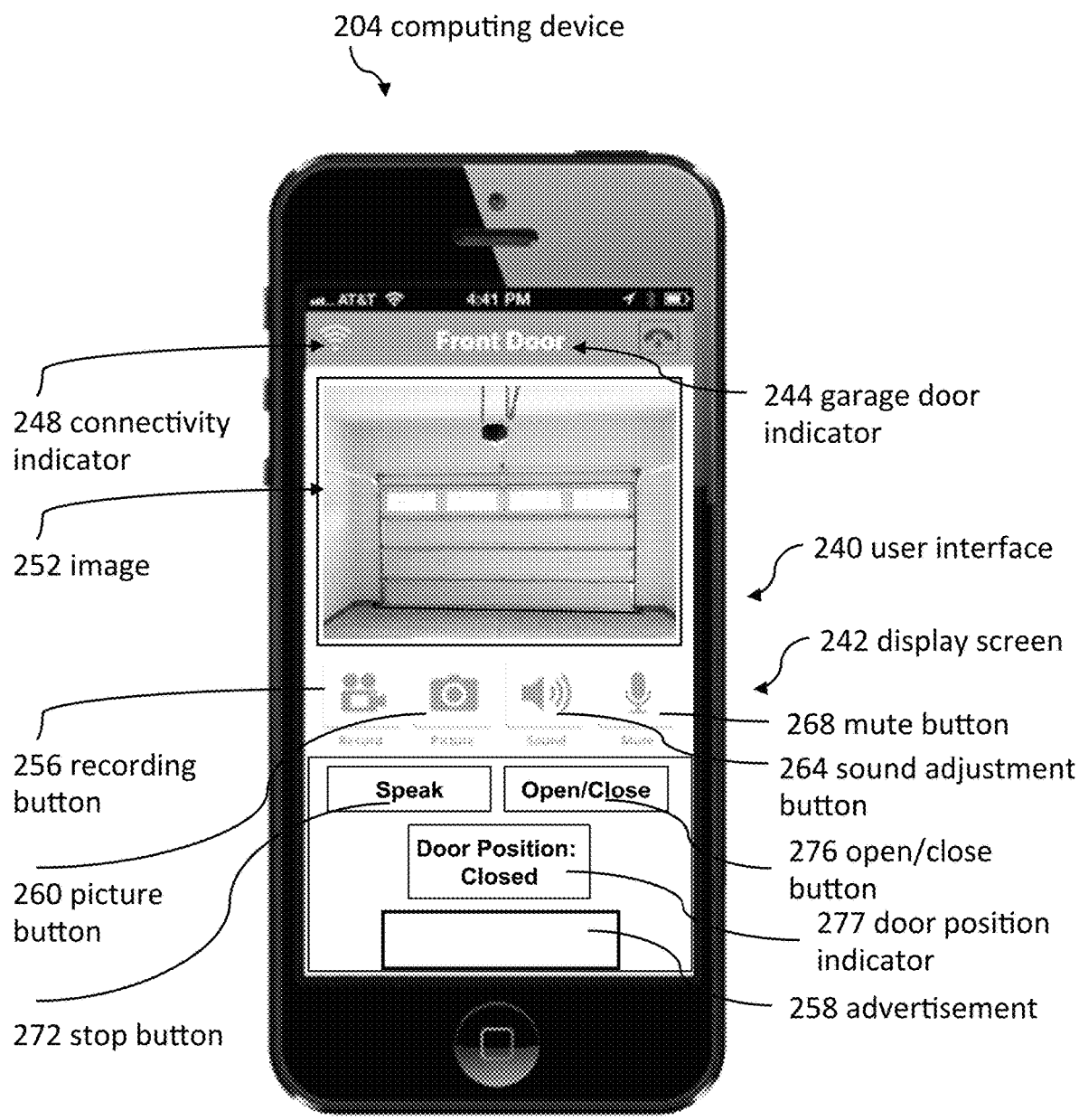
FIG. 2 illustrates a computing device running software, according to some embodiments.

As shown in FIG. 2, the computing device 204 can run software with a graphical user interface 240. The user interface 240 can include icons or buttons. In some embodiments, the software is configured for use with a touch-screen computing device such as a smartphone or tablet.

For example, in several embodiments a user can log into an "app," website, and/or software on a computing device 204 (e.g., mobile computing device, smartphone, tablet, desktop computer) to adjust the garage door controller settings discussed herein.

The software can include a user interface 240 displayed on a display screen of the remote computing device 204. The user interface 240 can include a garage door indicator 244, which can indicate the identity of the garage door (e.g. for systems with two or more garage doors). For example, a person can use one computing device 204 to control and/or interact with one or multiple garage door controllers, such as one garage door controller attached to a first garage door opener and another garage door controller attached to a second garage door opener.

The user interface 240 can include a connectivity indicator 248. In some embodiments, the connectivity indicator 248 can indicate whether the computing device 204 is in communication with a garage door controller 202, the Internet, and/or a cellular network. The connectivity indicator 248 can alert the user if the computing device 204 has lost its connection with the garage door controller 202; the garage door controller 202 has been damaged; the garage door controller 202 has been stolen; the garage door controller 202 has been removed from its mounting location; the garage door controller 202 has lost electrical power; and/or if the computing device 204 cannot communicate with the garage door controller 202. In some embodiments, the connectivity indicator 248 alerts the user of the computing device 204 by flashing, emitting a sound, displaying a message, and/or displaying a symbol.

In some embodiments, the user interface 240 can display a door position indicator 277, which can indicate the position of the garage door (e.g. whether the garage door is open, closed, partially open, partially closed, and/or whether the garage door is moving). The user interface 240 can also include open/close button 276 to enable a user to activate the garage door, to thereby move the garage door to an open, closed, partially open, and/or partially closed position, for example.

In some embodiments, a computing device can enable a user to watch live video and/or hear live audio from a garage door controller due to the user's request rather than due to actions of a visitor. Some embodiments include a computing device initiating a live video feed (or a video feed that is less than five minutes old).

As well, in some embodiments the user interface 240 displays an image 252 such as a still image or a video of an area near and/or in front of the garage door controller 202.

The image 252 can be taken by the camera assembly 208 and stored by the garage door controller 202, server 206, and/or computing device 204. The user interface 240 can include a recording button 256 to enable a user to record images, videos, and/or sound from the camera assembly 208, microphone of the security system 202, and/or microphone of the computing device 204.

In several embodiments, the user interface 240 includes a picture button 260 to allow the user to take still pictures and/or videos of the area near and/or in front of the security system. The user interface 240 can also include a sound adjustment button 264 and a mute button 268. The user interface 240 can include camera manipulation buttons such as zoom, pan, and light adjustment buttons. In some embodiments, the camera assembly 208 automatically adjusts between Day Mode and Night Mode. Some embodiments include an infrared camera and/or infrared lights to illuminate an area near the security system to enable the camera assembly 208 to provide sufficient visibility (even at night).

In some embodiments, buttons include diverse means of selecting various options, features, and functions. Buttons can be selected by mouse clicks, keyboard commands, and/or touching a touch screen. Many embodiments include buttons that can be selected without touch screens.

In some embodiments, the user interface 240 can include a quality selection button, not shown in FIG. 2, which can allow a user to select the quality and/or amount of the data transmitted from the garage door controller 202 to the computing device 204 and/or from the computing device 204 to the garage door controller 202.

In some embodiments, video can be sent to and/or received from the computing device 204 using video chat protocols such as FaceTime (by Apple Inc.) or Skype (by Microsoft Corporation). In some embodiments, these videos are played by videoconferencing apps on the computing device 204 instead of being played by the user interface 240.

The user interface 240 can include an open/close button 276 to activate the garage door opener 926 to move the garage door to the open, closed, partially open, and/or partially closed position. In some embodiments, in response to a first press of the open/close button 276, the button 276 can be enabled to activate the garage door opener 926 to move the garage door. As well, in response to a second press of the open/close button 276, the button 276 can be enabled to activate the garage door opener 926 to stop moving the garage door.

In some embodiments, a speak button 272 is both an answer button (to accept a communication request from a visitor located adjacent the garage door controller 202) and is a termination button (to end communication between the garage door controller 202 and the computing device 204). Selecting the button 272 when the system is attempting to establish two-way communication between the visitor and the user can start two-way communication. The button 272 can include the words "End Call" during two-way communication between the visitor and the user. Selecting the button 272 during two-way communication between the visitor and the user can terminate two-way communication. In some embodiments, terminating two-way communication still enables the user to see and hear the visitor. In some embodiments, terminating two-way communication causes the computing device 204 to stop showing video from the garage door controller 202 and to stop emitting sounds recorded by the garage door controller 202.

In some embodiments, the user interface 240 opens as soon as the garage door controller 202 detects a movement of the garage door or a presence of a visitor (e.g., senses indications of a visitor). Once the user interface 240 opens, the user can see and/or hear the visitor even before "answering" or otherwise accepting two-way communication, in several embodiments.

Some method embodiments include detecting a movement of a garage door or a presence of a visitor with a garage door controller 202. The methods can include causing the user interface 240 to display on a remote computing device 204 due to the detection of the garage door moving or the presence of the visitor (e.g., with or without user interaction).

The methods can include displaying video from the garage door controller 202 and/or audio from the garage door controller 202 before the user accepts two-way communication with the visitor. The methods can include displaying video from the garage door controller 202 and/or audio from the garage door controller 202 before the user accepts the visitor's communication request. The methods can include the computing device 204 simultaneously asking the user if the user wants to accept (e.g., answer) the communication request and displaying audio and/or video of the visitor. For example, in some embodiments, the user can see and hear the visitor via the garage door controller 202 before opening a means of two-way communication with the visitor.

In some embodiments, the software includes means to start the video feed on demand. For example, a user of the computing device might wonder what is happening near the garage door controller 202. The user can open the software application on the computing device 204 and instruct the application to show live video and/or audio from the garage door controller 202 even if no event near the garage door controller 202 has triggered the communication.

In several embodiments, the garage door controller 202 can be configured to record when the garage door controller 202 detects movement of the garage door and/or the presence of a person. The user of the computing device 204 can later review all video and/or audio records when the garage door controller 202 detected movement and/or the presence of a person.

Referring now to FIG. 1, in some embodiments, the server 206 controls communication between the computing device 204 and the garage door controller 202, which can include a camera, a microphone, and a speaker. In several embodiments, the server 206 does not control communication between the computing device 204 and the garage door controller 202.

In some embodiments, data captured by the security system and/or the computing device 204 (such as videos, pictures, and audio) is stored by another remote device such as the server 206. Cloud storage, enterprise storage, and/or networked enterprise storage can be used to store video, pictures, and/or audio from the garage door communication system 200 or from any part of the garage door communication system 200. The user can download and/or stream stored data and/or storage video, pictures, and/or audio. For example, a user can record visitors for a year and then later can review conversations with visitors from the last year. In some embodiments, remote storage, the server 206, the computing device 204, and/or the garage door controller 202 can store information and statistics regarding visitors and usage.

Server Interaction Overview

In some embodiments, if the garage door controller 202 loses power, loses connectivity to the computing device 204, loses connectivity to the Internet, and/or loses connectivity to a remote server, a remote server 206 sends an alert (e.g., phone call, text message, image on the user interface 240) regarding the power and/or connectivity issue. In several embodiments, the remote server 206 can manage communication between the garage door controller 202 and the computing device 204. In some embodiments, information from the garage door controller 202 is stored by the remote server 206. In several embodiments, information from the garage door controller 202 is stored by the remote server 206 until the information can be sent to the computing device 204, uploaded to the computing device 204, and/or displayed to the remotely located person via the computing device 204. The remote server 206 can be a computing device 204 that stores information from the garage door controller 202 and/or from the computing device 204. In some embodiments, the remote server 206 is located in a data center.

In some embodiments, the computing device 204 and/or the remote server 206 attempts to communicate with the garage door controller 202. If the computing device 204 and/or the remote server 206 is unable to communicate with the garage door controller 202, the computing device 204 and/or the remote server 206 alerts the remotely located person via the software, phone, text, a displayed message, and/or a website. In some embodiments, the computing device 204 and/or the remote server 206 attempts to communicate with the garage door controller 202 periodically; at least every five hours and/or less than every 10 minutes; at least every 24 hours and/or less than every 60 minutes; or at least every hour and/or less than every second.

In some embodiments, the server 206 can initiate communication to the computer device 204 and/or to the garage door controller 202. In several embodiments, the server 206 can initiate, control, and/or block communication between the computing device 204 and the garage door controller 202.

Some embodiments can include programming the remote server 206 to instruct the garage door controller 202 to perform a first predetermined action at a first time of day and programming the remote server 206 to instruct the garage door controller 202 to perform a second predetermined action at a second time of day. For example, the remote server 206 can be programmed to instruct the garage door controller 202 to check whether the garage door 927 is closed at sunset. If the garage door controller 202 determines that the garage door 927 is not closed at sunset, the garage door controller 202 can send a transmission to the garage door opener 926 to close the garage door 927. Generally, it should be appreciated that the remote server 206 and garage door controller 202 can be programmed to perform any predetermined action at any time of day.

System Overview

Figure 3:
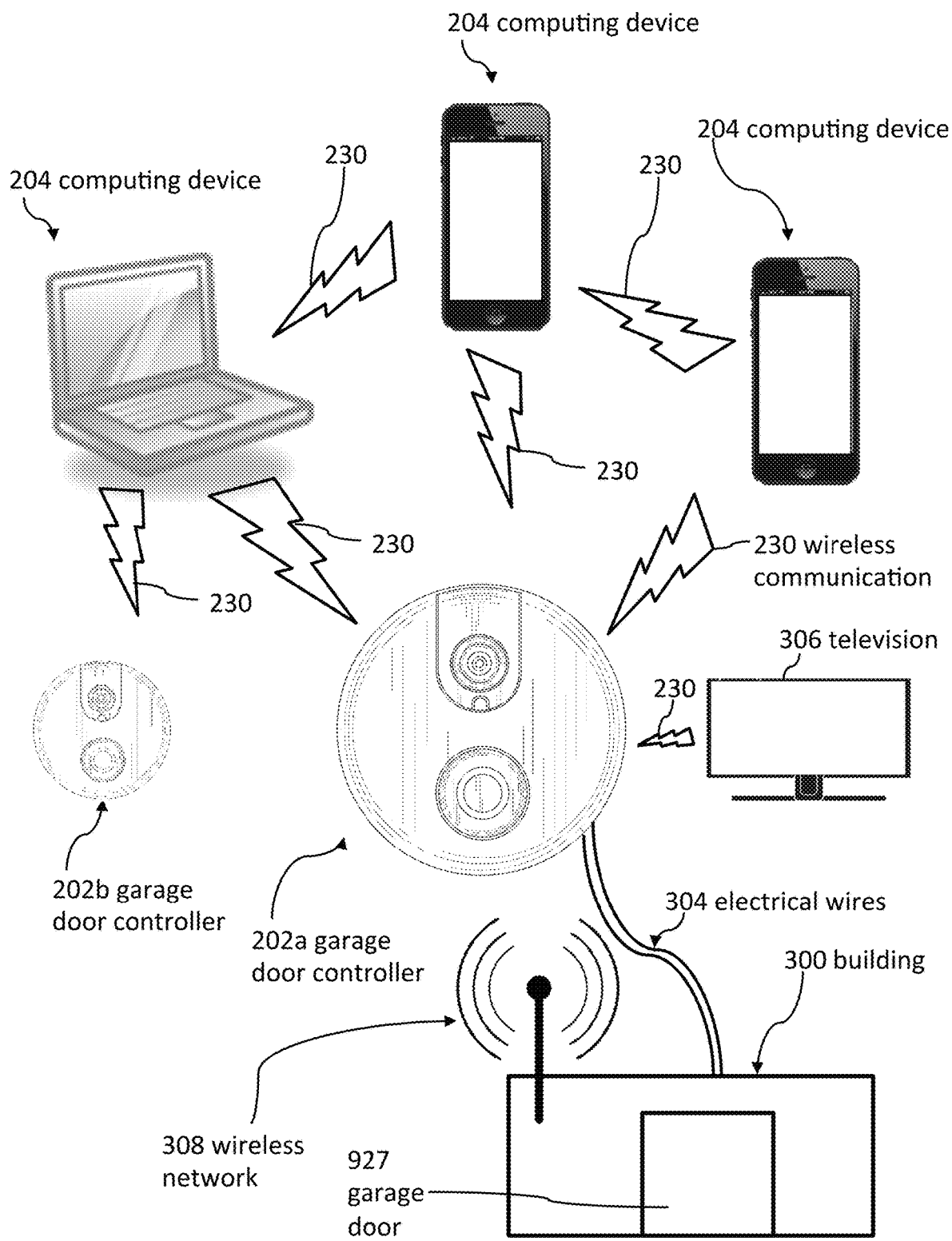
FIG. 3 illustrates an embodiment in which a garage door controller is connected to a building, according to some embodiments.

FIG. 3 illustrates an embodiment in which a garage door controller 202 is connected to a building 300, which can include a garage door 927. Electrical wires 304 can electrically couple the garage door controller 202 to the electrical system of the building 300 so that the garage door controller 202 can receive electrical power from the building 300.

A wireless network 308 can allow devices to wirelessly access the Internet. The garage door controller 202 can access the Internet via the wireless network 308. The wireless network 308 can transmit data from the garage door controller 202 to the Internet, which can transmit the data to remotely located computing devices 204. The Internet and wireless networks can transmit data from remotely located computing devices 204 to the garage door controller 202. In some embodiments, a garage door controller 202 connects to a home's WiFi.

As illustrated in FIG. 3, one computing device 204 (e.g., a laptop, a smartphone, a mobile computing device, a television) can communicate with multiple garage door controllers 202. In some embodiments, multiple computing devices 204 can communicate with one garage door controller 202. In some embodiments, the garage door controller 202 can communicate (e.g., wirelessly 230) with a television 306, which can be a smart television. Users can view the television 306 to see a position of the garage door 927 and/or to see and/or talk with a visitor located in the area of the garage door controller 202.

Joining a Wireless Network

Although some garage door controller embodiments include using electricity from electrical wires 304 of a building 300, many garage door controller embodiments communicate with computing devices 204 via a wireless network 308 that allows garage door controllers 202 to connect to a regional and sometimes global communications network. In some embodiments, the garage door controller 202 communicates via a wireless network 308 with a router that enables communication with the Internet, which can enable communication via diverse means including telecommunication networks. In this way, a garage door controller 202 can communicate with computing devices 204 that are desktop computers, automobiles, laptop computers, tablet computers, cellular phones, mobile devices, and smart phones.

In some embodiments, a security system (e.g., a doorbell) needs to know which wireless network to join and needs to know the wireless network's password. A computing device, such as a smartphone, can provide this information to the security system.

The following method is used in some embodiments. (Some embodiments include orders that are different from the following order.) First, the computing device (e.g., a smartphone) creates an ad hoc wireless network. Second, the user opens software (such as an app) on the computing device. When the garage door controller 202 is in Setup Mode, the garage door controller 202 can automatically join the computing device's ad hoc network. Third, the user can utilize the software to select the wireless network that the security system should join and to provide the password of the wireless network (e.g., of the router) to the garage door controller 202.

Diverse methods can be used to connect a garage door controller 202 to a wireless network (such as a wireless network of a home). Several embodiments include transmitting an identifier (e.g., a name) to a garage door controller 202, wherein the identifier enables the garage door controller 202 to identify the wireless network to which the garage door controller 202 should connect. Several embodiments include transmitting a password of the wireless network to the garage door controller 202, wherein the password enables the garage door controller 202 to connect to the network. In some embodiments, a computing device 204 (e.g., a smartphone) transmits the identifier and password.

In several embodiments, methods of connecting a garage door controller 202 to a wireless network (e.g., a wireless network of a home or building) can include placing the garage door controller 202 in Setup Mode. Some garage door controller 202 automatically go into Setup Mode upon first use, first receiving electrical power, first receiving electrical power after a reset button is pushed, first receiving electrical power after being reset, and/or when a reset button is pushed.

In some embodiments, a Setup Mode comprises a Network Connection Mode. Methods can comprise entering the Network Connection Mode in response to pressing the button for a predetermined amount of time. It should be appreciated that the predetermined amount of time can be any duration of time, for example at least eight seconds. The Network Connection Mode can also comprise detecting a first wireless network having a name and a password. The Network Connection Mode can comprise inputting a doorbell identification code into the remotely located computing device. The doorbell identification code can be associated with the doorbell. The Network Connection Mode can comprise using the doorbell identification code to verify whether the remotely located computing device is authorized to communicate with the doorbell. The Network Connection Mode can comprise the remotely located computing device creating a second wireless network (e.g., that emanates from the remotely located computing device). The Network Connection Mode can comprise transmitting the name and the password of the first wireless network directly from the remotely located computing device to the garage door controller 202 via the second wireless network to enable the garage door controller 202 to communicate with the remotely located computing device 204 via the first wireless network.

Methods can comprise the remotely located computing device 204 directly communicating with the garage door controller 202 via the second wireless network prior to the garage door controller 202 indirectly communicating with the remotely located computing device 204 via the first wireless network. For example, the wireless communication from the remotely located computing device 204 can travel through the air directly to the garage door controller 202. The wireless communication from the remotely located computing device 204 can travel indirectly to the garage door controller 202 via a third electronic device such as a server.

Figure 4:
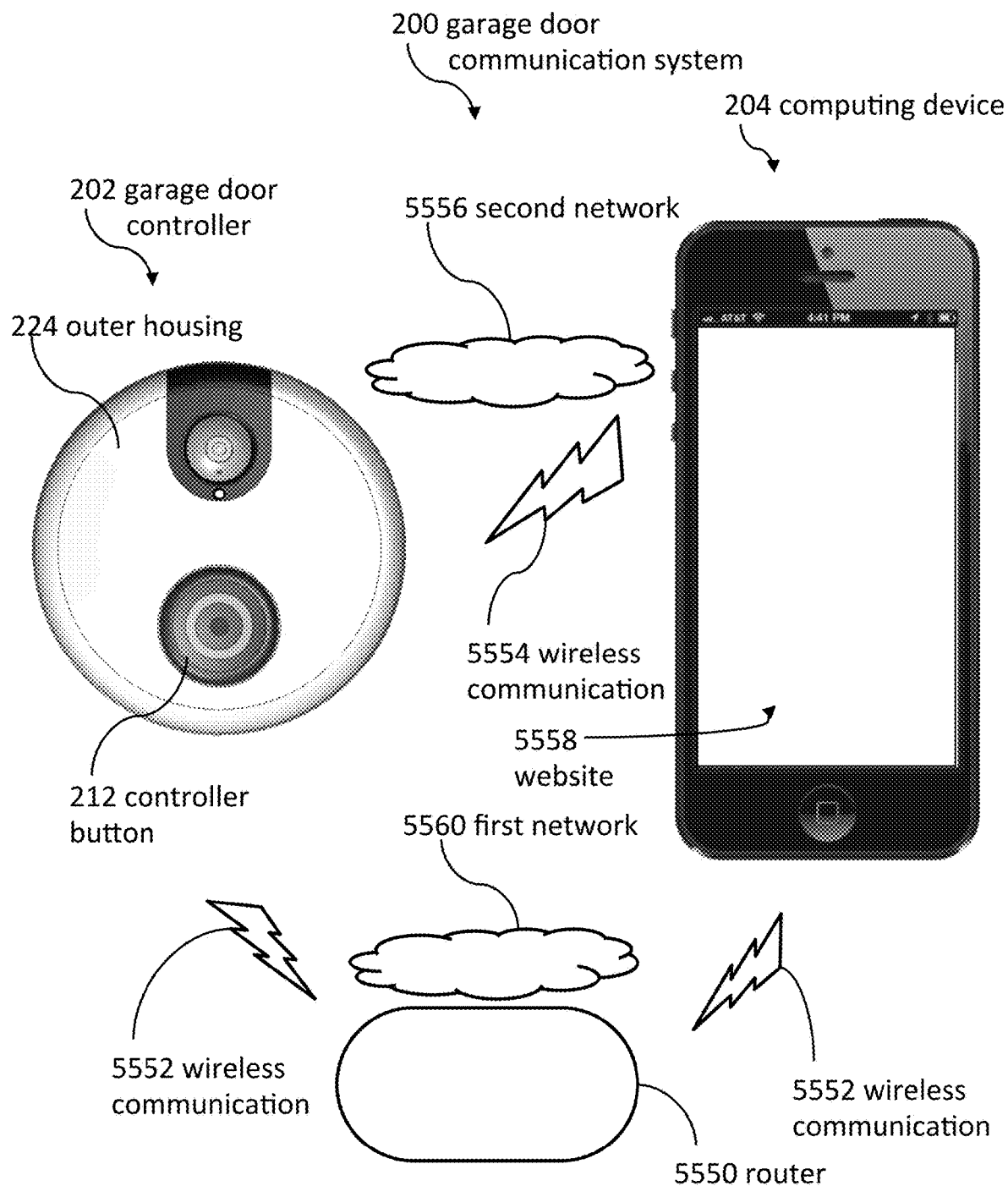
FIG. 4 illustrates a communication system with two wireless networks, according to some embodiments.

FIG. 4 illustrates a garage door communication system 200 with two wireless networks 5556, 5560. The first wireless network 5560 can emanate from a router 5550. The second wireless network can emanate from the computing device 204 (e.g., a cellular telephone). The first wireless network 5560 can enable indirect wireless communication 5552 between the computing device 204 and the garage door controller 202 via the router 5550 or via a server 206 (shown in FIG. 1). The second wireless network 5556 can enable direct wireless communication 5554 between the computing device 204 and the garage door controller 202. The computing device 204 can send a password and a name of the first wireless network 5560 to the garage door controller 202 via the second wireless network 5556. In some embodiments, the second wireless network 5556 does not require a password.

In some embodiments, a garage door controller 202 creates its own wireless network (e.g., WiFi network) with a recognizable network name (e.g., a service set identifier). Software can provide setup instructions to the user via a computing device 204, in some cases, upon detecting a new wireless network with the recognizable network name. The instructions can inform the user how to temporarily join the security system's wireless network with the computing device 204. The user can select and/or transmit the name and password of a target wireless network to the garage door controller 202 from the computing device 204. The garage door controller 202 can join the target wireless network (e.g., the wireless network of the building to which the garage door controller is attached) and can terminate its own wireless network.

In some cases, the computing device 204 can capture the name and password of the target network before joining the network of the garage door controller 202. In some cases, the user enters the name and password of the target network into the computing device 204 to enable the computing device 204 to provide the name and password of the target network to the garage door controller 202.

In some cases, the computing device 204 recognizes the name of the network of the garage door controller 202, automatically joins the network of the garage door controller 202, and transmits the name and password of the target network to the garage door controller 202. In some cases, these steps are preceded by launching software (on the computing device 204) configured to perform these steps and/or capable of performing these steps.

Methods can include the garage door controller 202 trying to join an ad hoc network (or other wireless network) with a fixed network name or a network name based on an identifier of the garage door controller 202 (e.g., the serial number of the garage door controller 202, the model number of the garage door controller 202). The computing device 204 can provide instructions to the user to temporarily setup the network (e.g., the ad hoc network) via the computing device 204. The network can have the fixed network name or the name based on the identifier. The garage door controller 202 can recognize the name and join the network. The computing device 204 can use the network to transmit the name and password of a target network (e.g., the wireless network of the building to which the garage door controller 202 will be coupled) to the garage door controller 202. The garage door controller 202 can use the name and password of the target network to join the target network.

In some embodiments, the computing device 204 displays an image (e.g., a quick response code) that contains or communicates the name and password of the target network. The garage door controller 202 can use its camera and onboard software to scan and decode the image (to determine the name and password of the target network). The garage door controller 202 can use the name and password of the target network to join the target network.

The computing device 204 can generate and display pulses of light (e.g., by flashing black and white images on the screen of the computing device 204). The garage door controller 202 can use its camera and software to analyze and decode the pulses of light. The pulses of light can contain the name and/or password of the wireless network. The garage door controller 202 can use the name and password of the target network to join the target network.

In some embodiments, only the password of the target network is given to the garage door controller 202. The garage door controller 202 can use the password to test each detected wireless network until it identifies a wireless network to which it can connect using the password.

The computing device 204 can generate and emit an audio signal that corresponds to the name and/or password of the target network. The garage door controller 202 can use its microphone and software to analyze and decode the audio signal to receive the name and/or password of the target network. The garage door controller 202 can use the name and password of the target network to join the target network.

In some embodiments, the computing device 204 transmits the name and password of the target network to the garage door controller 202 via Morse code. In some embodiments, the garage door controller 202 can pair with the computing device 204 via Bluetooth. The computing device 204 can transmit the name and password of the target network to the garage door controller 202 (e.g., via Bluetooth). The garage door controller 202 can use the name and password of the target network to join the target network.

In several embodiments, the computing device 204 transmits the name and/or password of the target network via infrared ("IR") communication (e.g., IR light) to the garage door controller 202. The computing device 204 can emit the IR communication via IR LEDs or IR display emissions. An infrared emission device (e.g., with an IR LED) can be electrically coupled to the computing device 204 to enable the computing device 204 to send IR communications. The garage door controller 202 can detect the IR communication via IR sensors. The garage door controller 202 can use the name and password of the target network to join the target network.

Communicating with a User and Activating a Garage Door

Figure 7A:
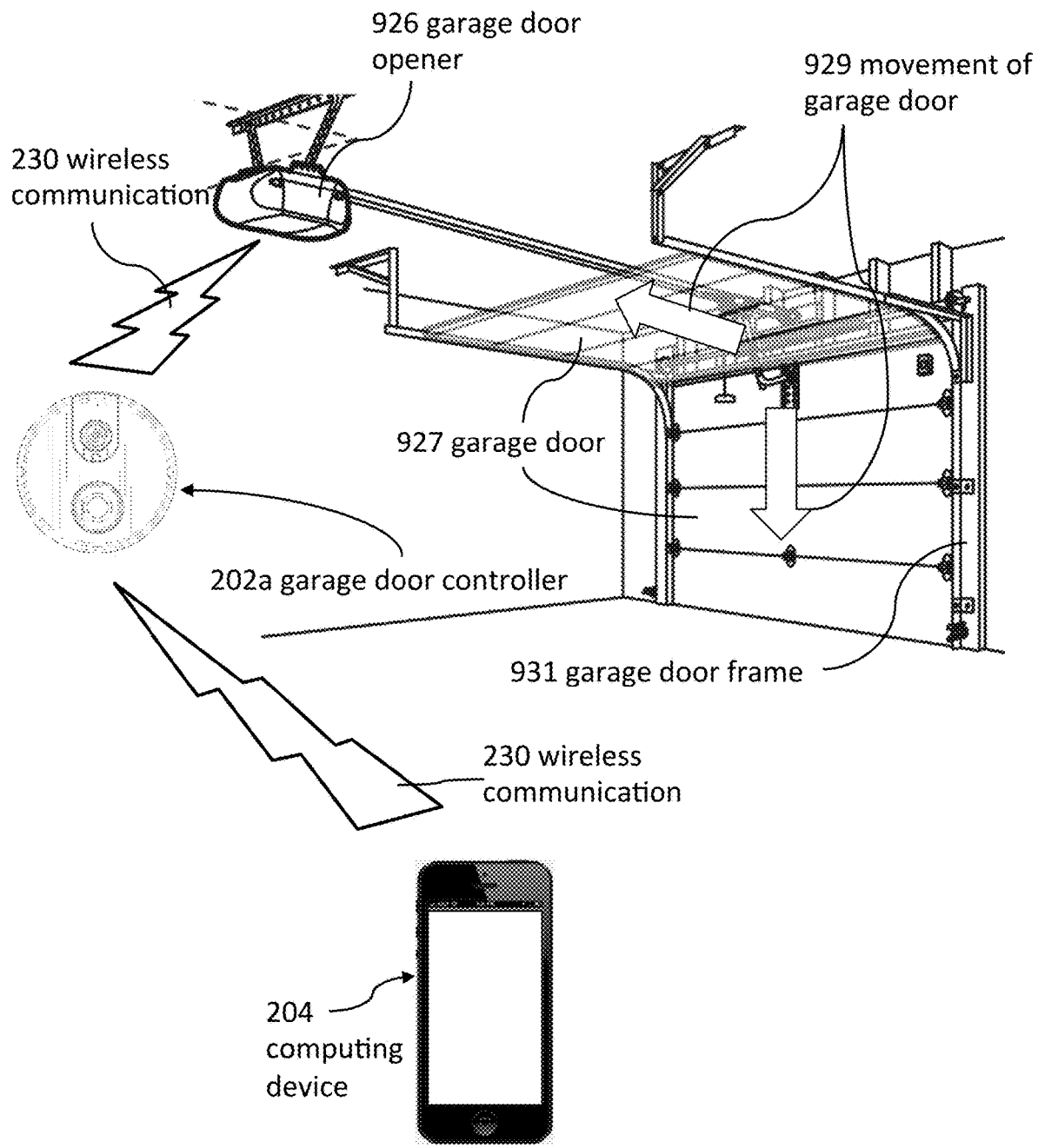
FIGS. 7a, 7b, and 7c illustrate perspective views of garage door communication systems, according to some embodiments.
Figure 7B:
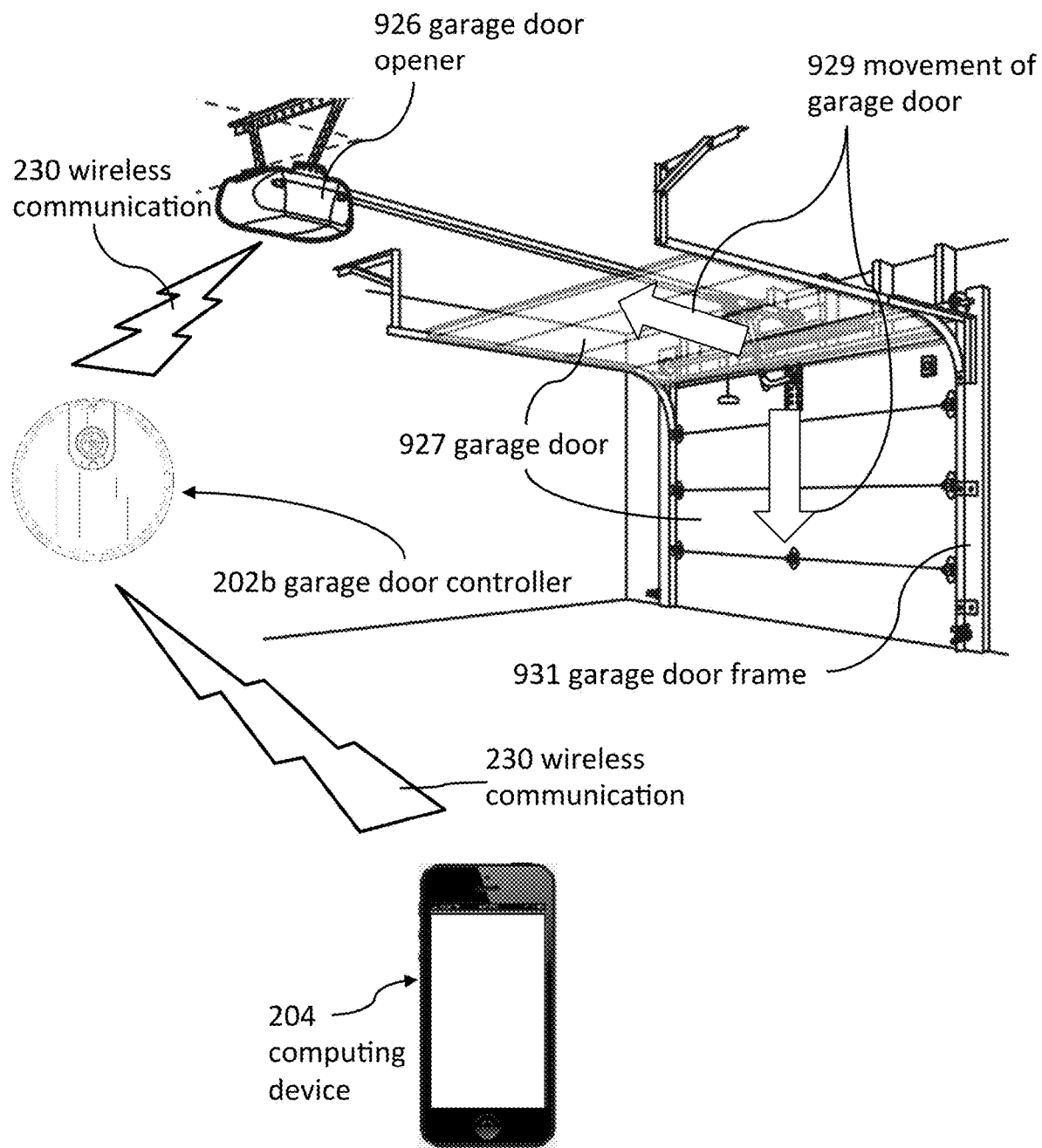
Figure 7C:
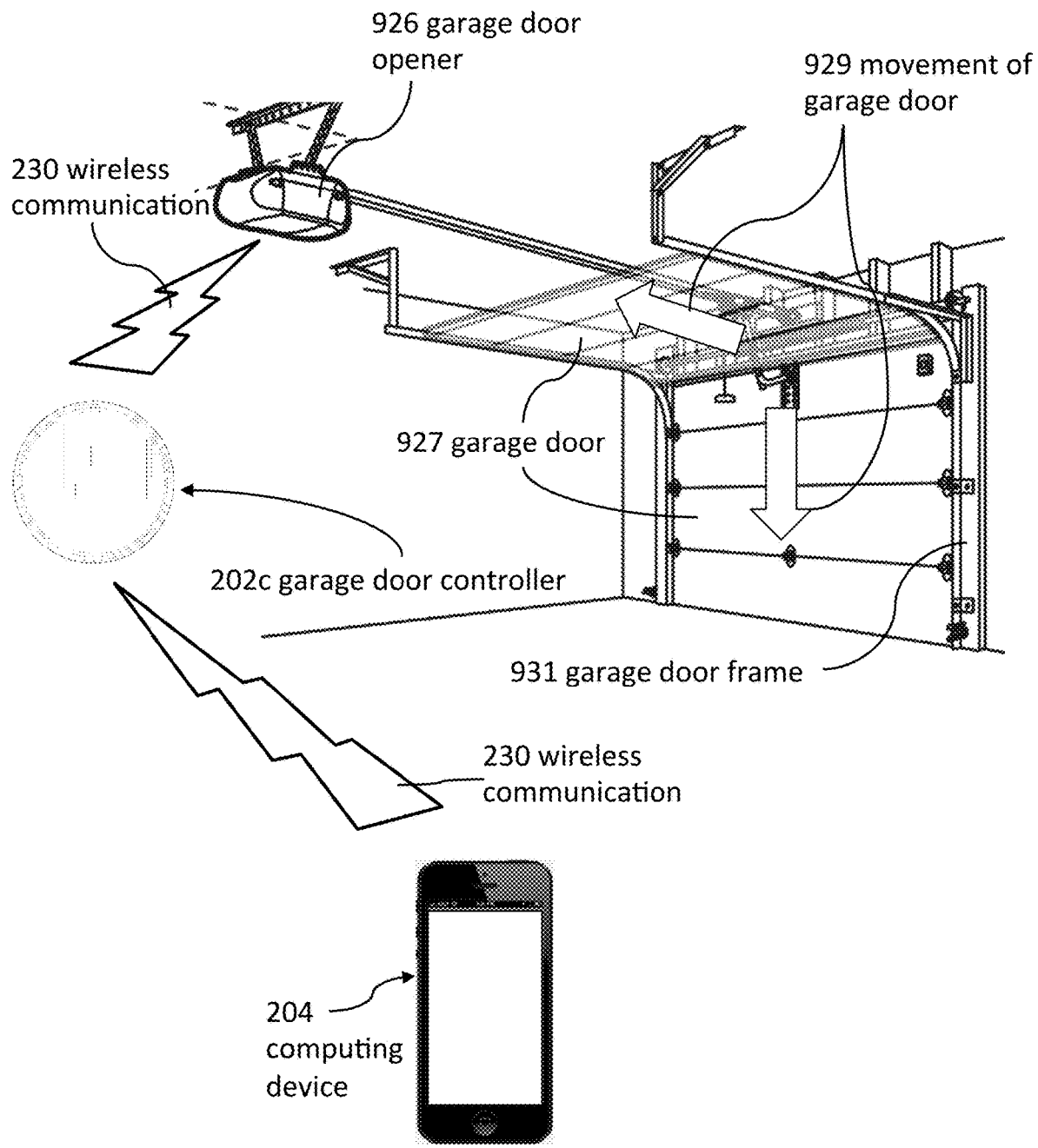
Figure 8A:
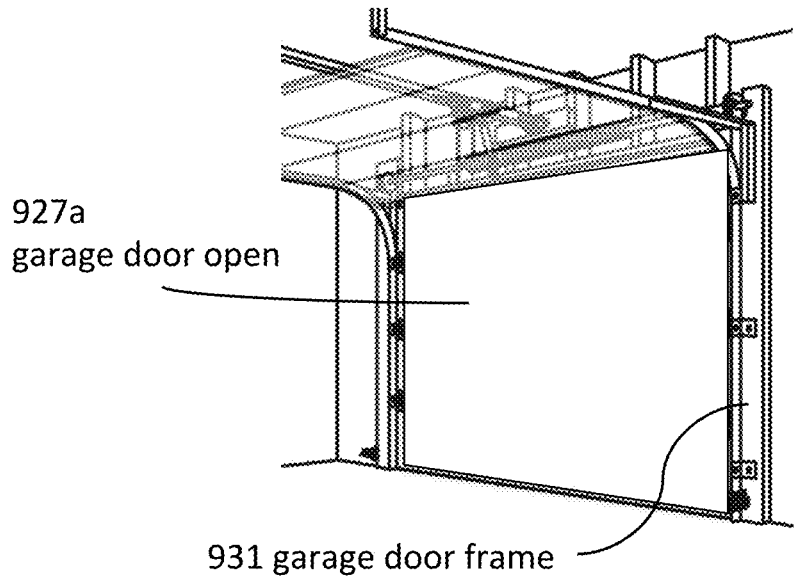
FIGS. 8a, 8b, 8c, 8d and 8e illustrate various views of a garage door being operated according to various embodiments.
Figure 8B:
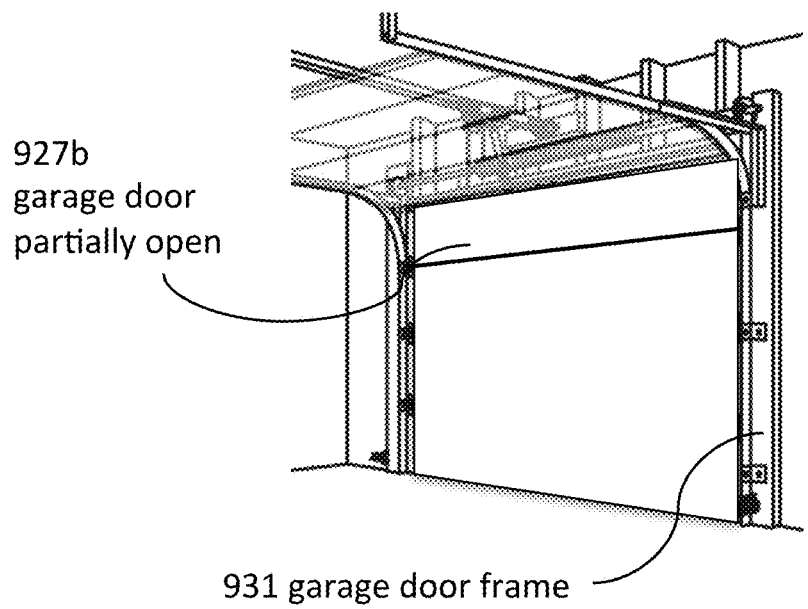
Figure 8C:
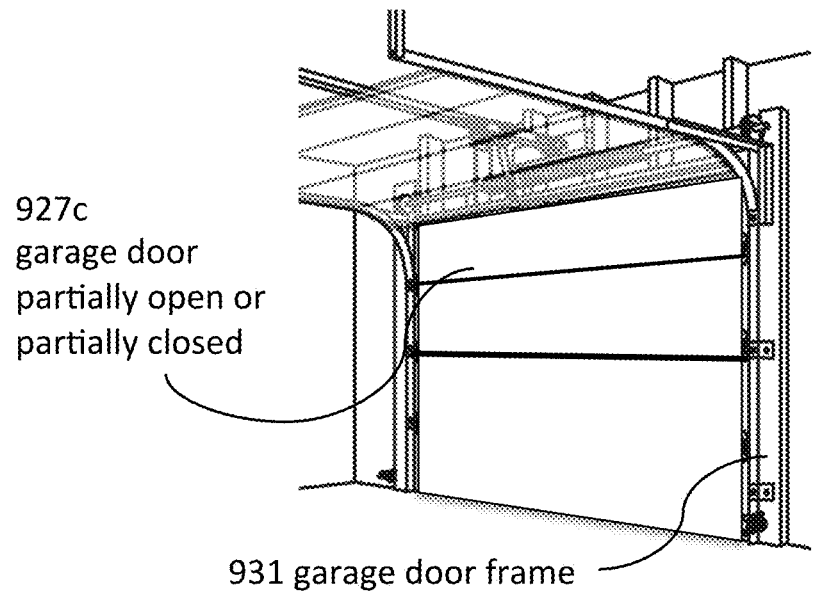
Figure 8D:
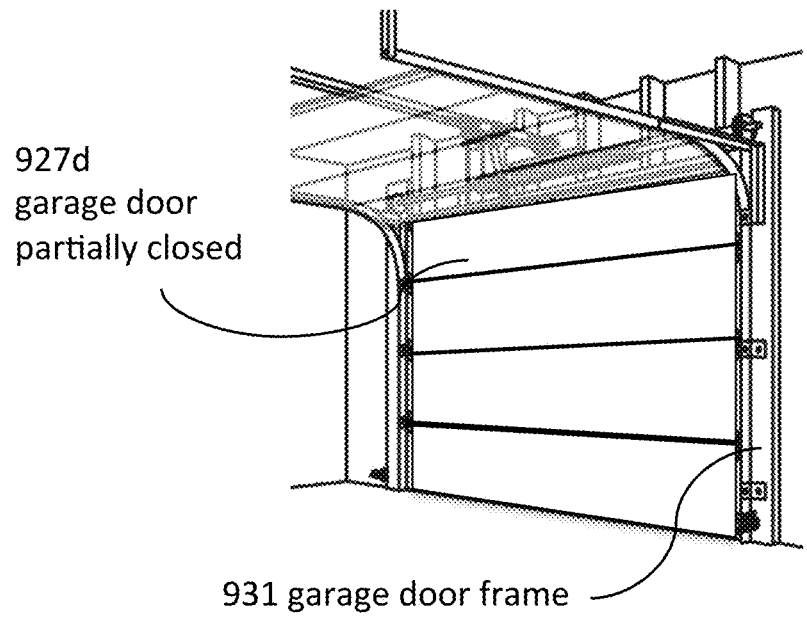
Figure 8E:
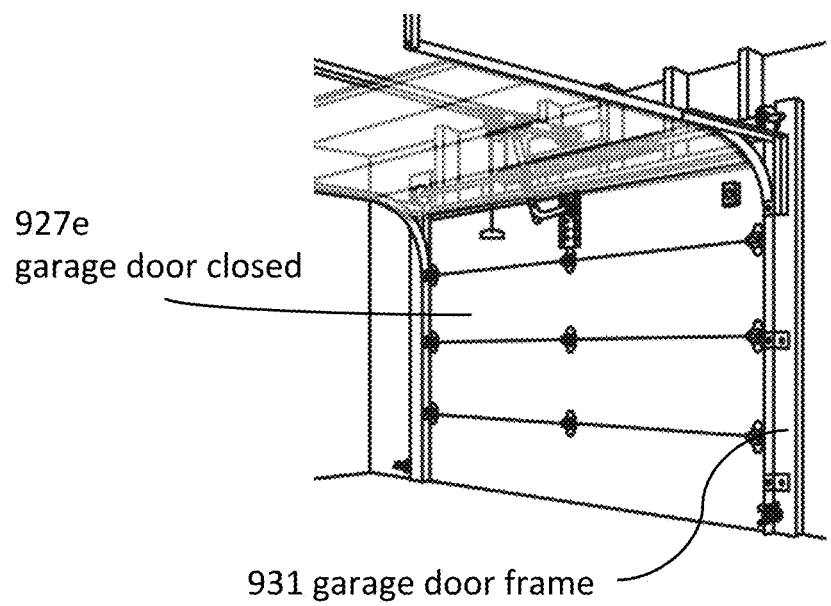
Figure 9:
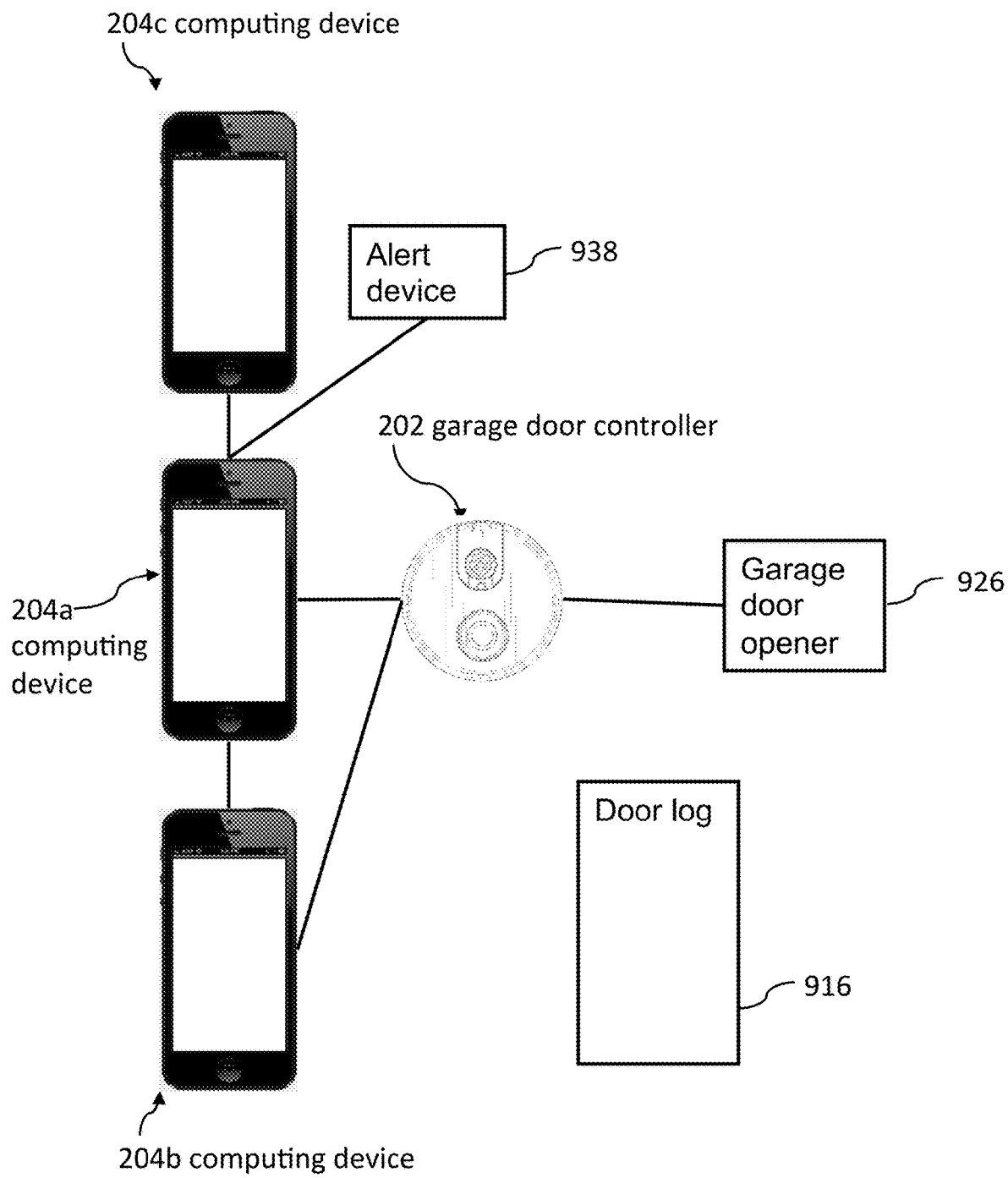
FIG. 9 illustrates a garage door communication system including multiple remote computing devices, according to some embodiments.
Figure 10:
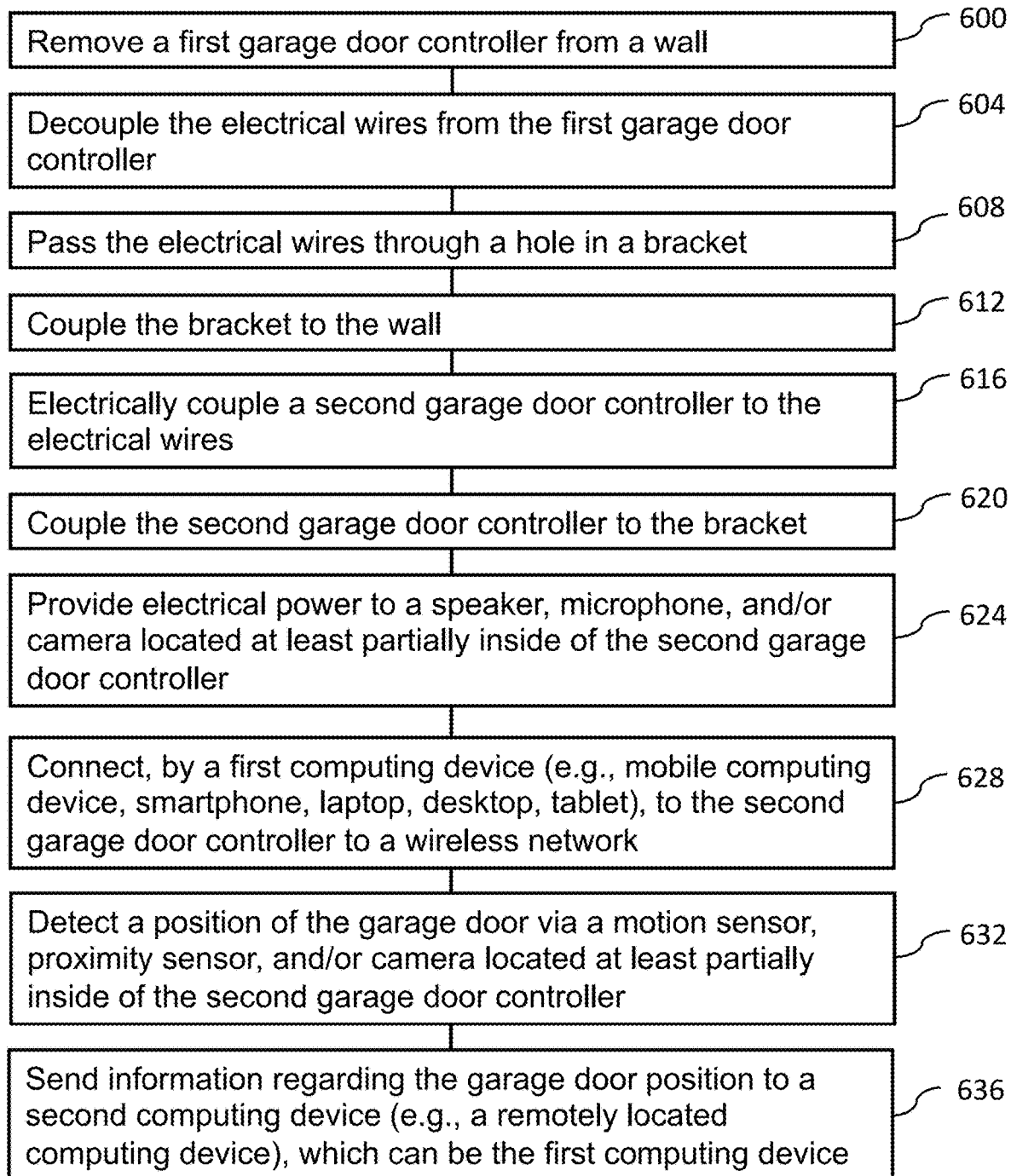
FIGS. 10-16 illustrate flow-charts of various methods of using a doorbell system, according to some embodiments.
Figure 11:
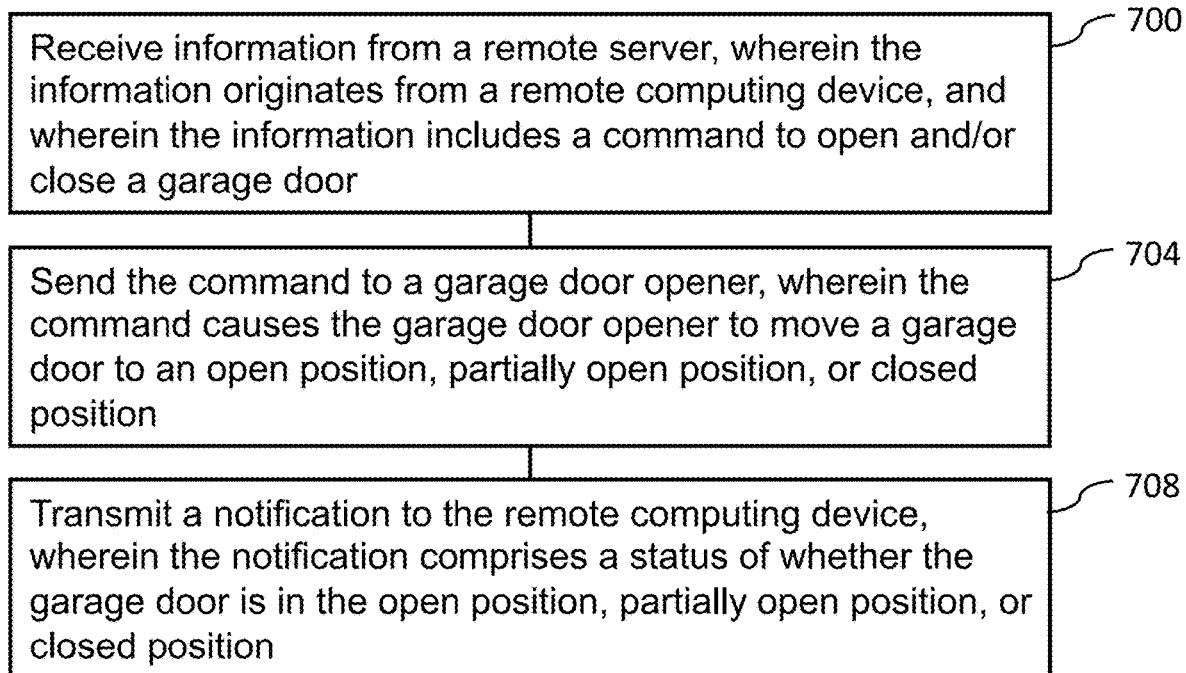
Figure 12:
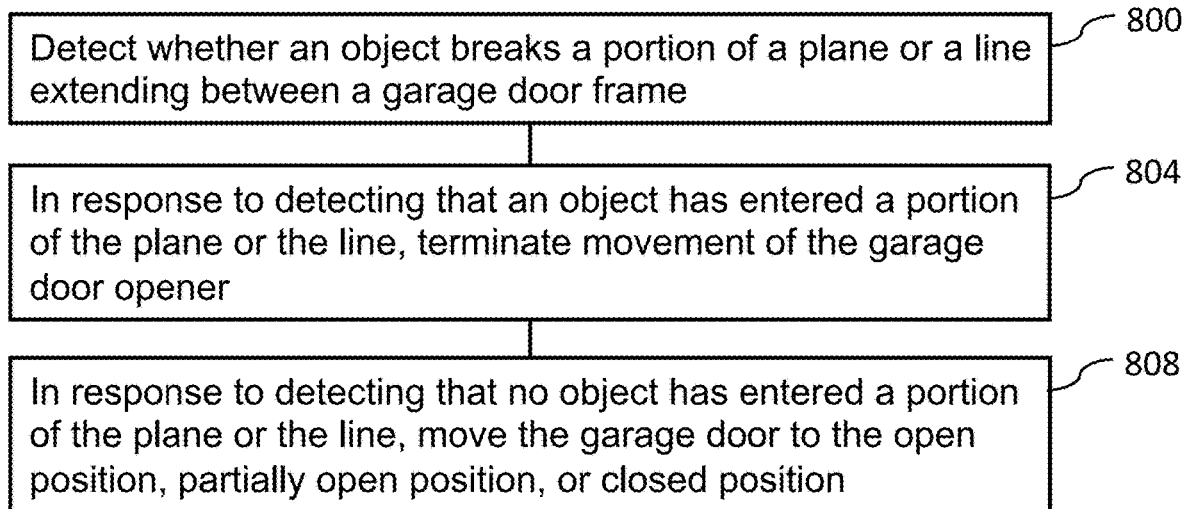
Figure 13:
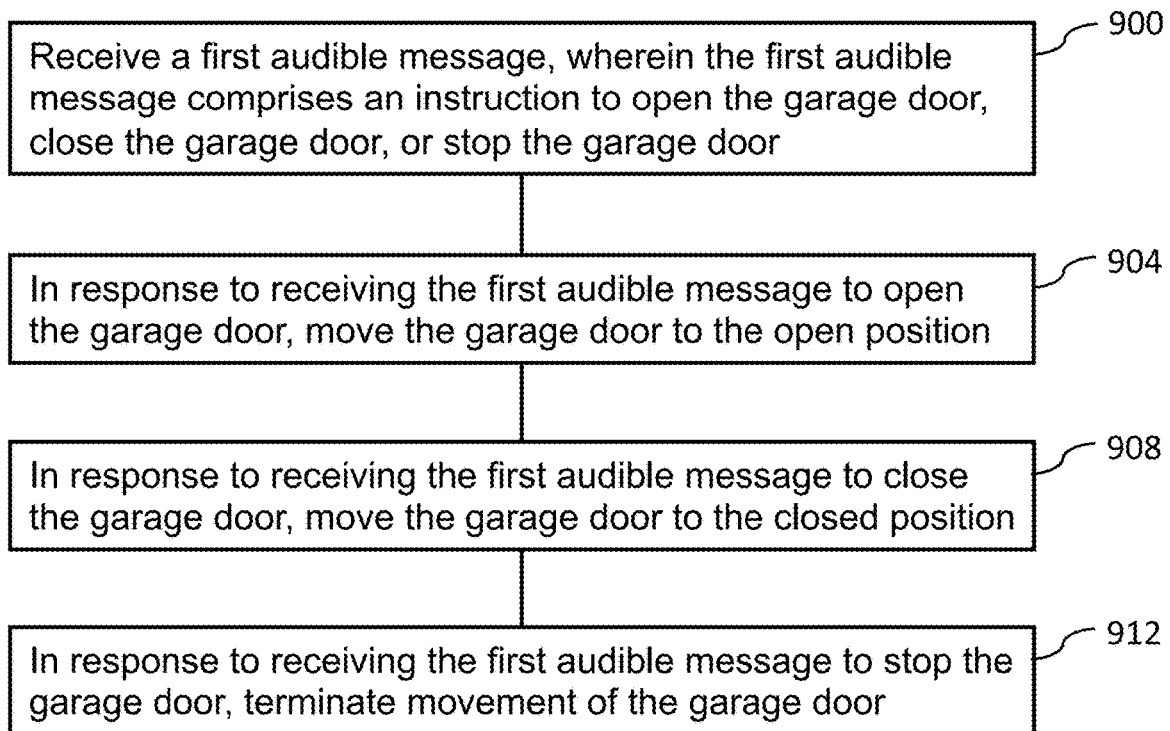
Figure 14:
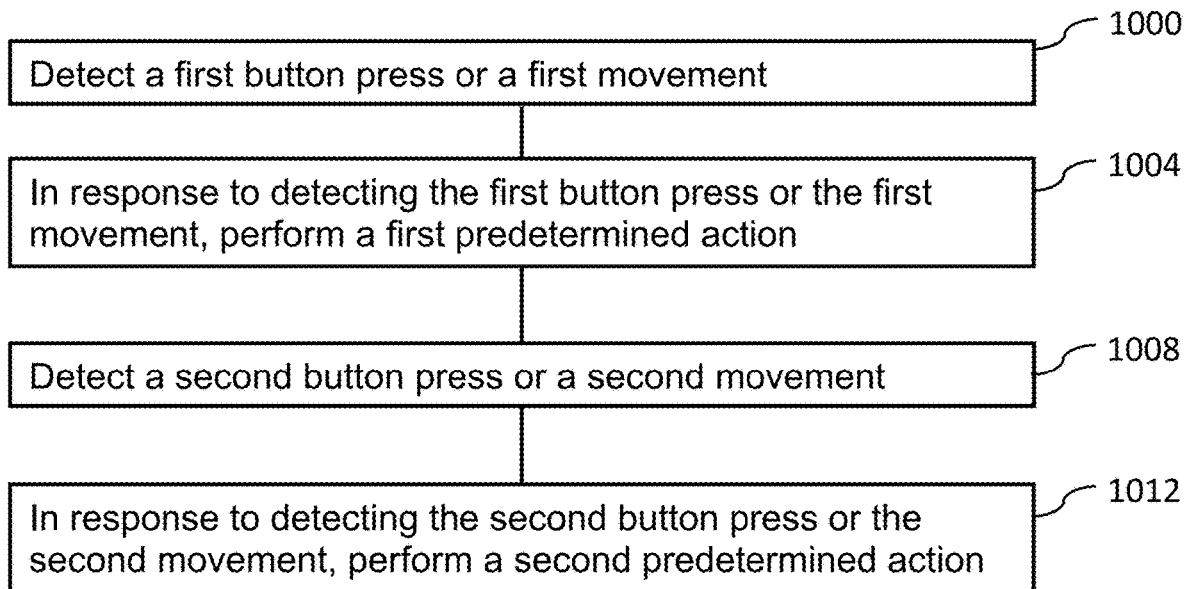
Figure 15:
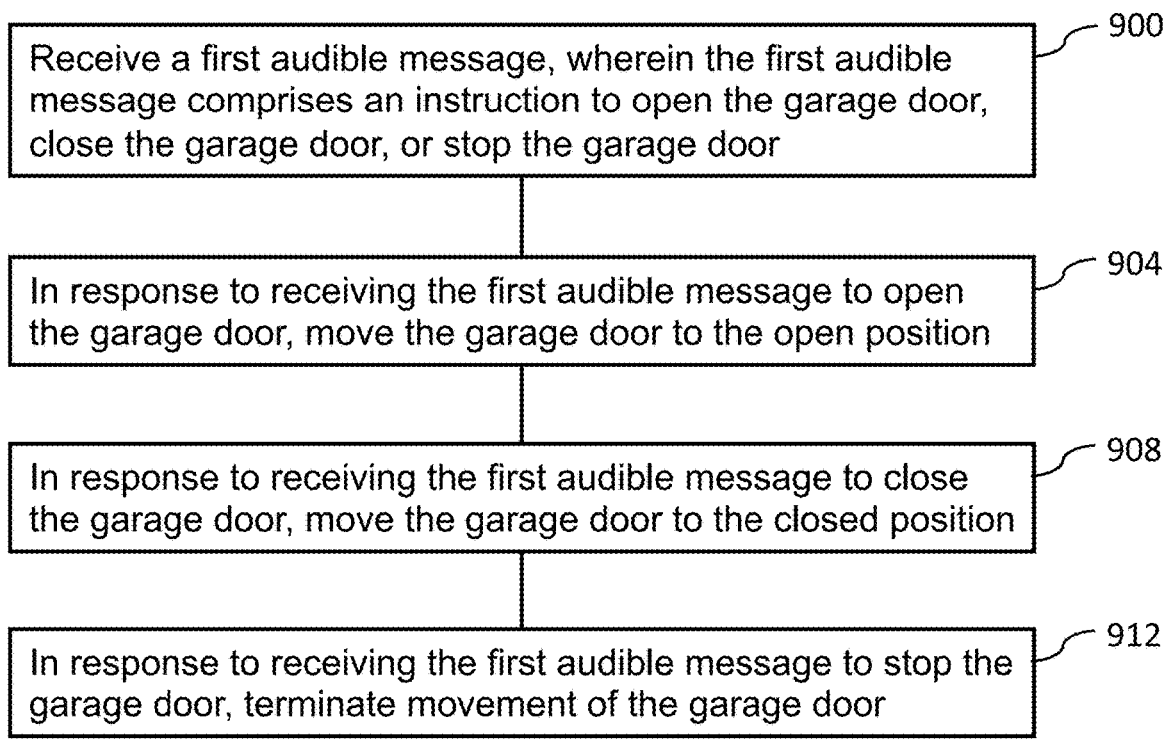
Figure 16:
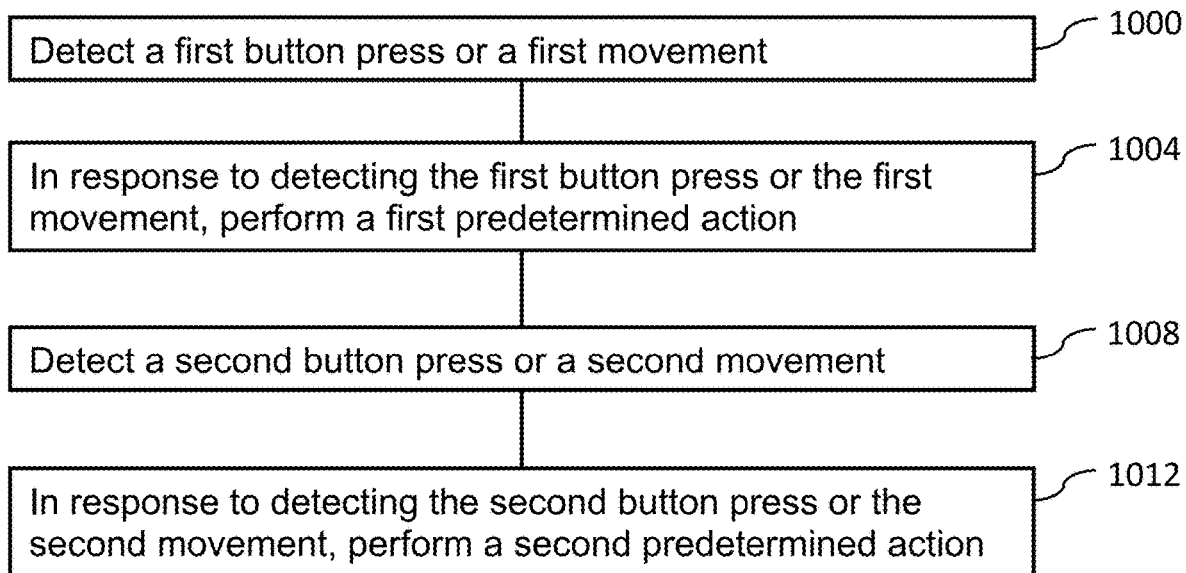

With reference to FIGS. 7a-7c, embodiments of the garage door controller 202 can be configured to initiate movement of a garage door opener 926 to thereby move a garage door 927 that is coupled to the garage door opener 926. As illustrated in FIGS. 8a-8e, the garage door 927 can move between an open position 927a, partially open position 927b, partially open or partially closed position 927c, partially closed position 927d, and/or a closed position 927e. However, it should be appreciated that these terms can be used interchangeably. For example, the position of the garage door 927 in FIG. 8b can be said to be either partially open or partially closed. Generally, it should be appreciated that the garage door controller 202 can initiate movement of the garage door opener 926 and the garage door 927 to any known position as during conventional usage of a garage door opener 926 and garage door 927.

Embodiments of a garage door controller 202, as disclosed, can enable a user to retrieve information from and control a garage door 927 from virtually anyplace in the world. With the proliferation of cellular networks, such as 3G, 4G, and LTE, and WiFi networks, people can be connected to mobile communication standards from almost any location. Accordingly, when the user's remote computing device 204 is connected to a mobile communication standard, such as, but not limited to, 3G, 4G, LTE, WiMAX, and WiFi, the user may be able to retrieve information from the garage door controller and also control the garage door and/or garage door opener via the garage door controller. In some embodiments, the remote computing device 204 can be at least 100 feet away from the garage door opener 926. Yet in some embodiments, the remote computing device 204 is at least one mile away, ten miles, one hundred miles, or at least one thousand miles from the garage door opener 926.

Accordingly, with the remote computing device 204 connected to a mobile communication standard, the remote computing device 204 is thereby communicatively coupled to the remote server. In conjunction, the remote server is communicatively coupled to the garage door controller 202 via WiFi. Therefore, it can be said that the remote computing device 204 is also communicatively coupled to the garage door controller 202 via WiFi. Therefore, some embodiments of the garage door controller 202 can include receiving, by the garage door controller 202, a WiFi transmission from the remote computing device 204, wherein the WiFi transmission includes a command to move the garage door to the open position 927a, partially open position 927b, 927c, 927d, or closed position 927e. In response to receiving the WiFi transmission from the remote computing device, some embodiments can include moving the garage door to the open position 927a, partially open position 927b, 927c, 927d, or closed position 927e.

To access information from the garage door 927 and the area surrounding the garage door 927, the user may retrieve this information any number of ways. For example, in some embodiments the garage door controller 202 may include a camera assembly 208. The camera assembly 208 can be a video camera, which in some embodiments is a webcam. The remotely located user may be able to activate the camera assembly 208 from their remote computing device 204 to thereby view the garage door 927 and the area surrounding the garage door 927. Accordingly, a user may use this feature for any number of possibilities. For example, a remote user may view whether the garage door is open or closed. If the user observes that the garage door is open and the user wishes to close the garage door 927, the user may enable a command from the remote computing device 204 to thereby activate a movement of the garage door 927 to a closed position 927e. In some embodiments, a remote user may wish to view the area inside the garage to determine if a prowler is present to thereby verify the security of the garage. In another example, a remote user may wish to view whether a car is located in the garage, which may thereby indicate the presence of another user within the building. These are just a few of the countless examples to demonstrate how the camera assembly 208 may be utilized.

Some embodiments of the garage door controller 202 can be configured to initiate communication between a visitor, located in an area near the garage door controller 202, and a user of a remote computing device 204 (e.g. a homeowner). The communications may enable voice and/or visual communication between the user and/or the visitor. As well, the communications may serve as instructions to the garage door controller 202 to thereby activate the garage door 927 to perform an operation, such as moving to an open position 927a or a closed position 927e.

For example, the controller button 212 may be configured to enable various operations. For example, a person might initiate a communication request by pressing the controller button 212 (shown in FIG. 1) or triggering a motion or proximity sensor. The controller button 212 may be configured to enable various operations in response to different types of presses of the controller button 212. For example, in some embodiments, a user may press and hold the controller button 212 for at least three seconds to thereby initiate a communication request. As well, in some embodiments, a user may press the controller button 212 for less than three seconds to thereby initiate a movement of the garage door opener and the garage door 927.

In some embodiments, multiple computing devices 204 are candidates to receive information from a garage door controller 202. Accordingly, in response to the controller button 212 being pressed, the garage door controller 202 can notify multiple remotely located computing devices at once. The garage door controller 202 might simultaneously notify a smartphone of a first homeowner, a tablet of a housekeeper, and a laptop located inside the building to which the security system is connected.

In some embodiments, once the communication is answered by one computing device, communication between the garage door controller 202 and the other computing devices is terminated, maintained, or kept open so another user can also participate in the communication. For example, if a housekeeper answers the communication request initiated by pressing the controller button 212, the homeowner might be unable to join the communication because communication with her computing device was terminated or might have the option to join the communication. In some embodiments, computing devices are assigned a priority and computing devices with a higher priority can terminate the communication of lower priority devices. For example, the homeowner could answer the communication request later than the housekeeper, but the homeowner could terminate the communication between the garage door controller 202 and the housekeeper's computing device. In some embodiments, users can forward communication requests from one computing device to another computing device.

In some embodiments, multiple computing devices are notified in series regarding a communication request. For example, the communication request might initially go to a first remote computing device, but if the communication request is not answered within a certain period of time, the communication request might go to a second remote computing device. If the communication request is not answered, the communication request might go to a third remote computing device.

Figure 5:
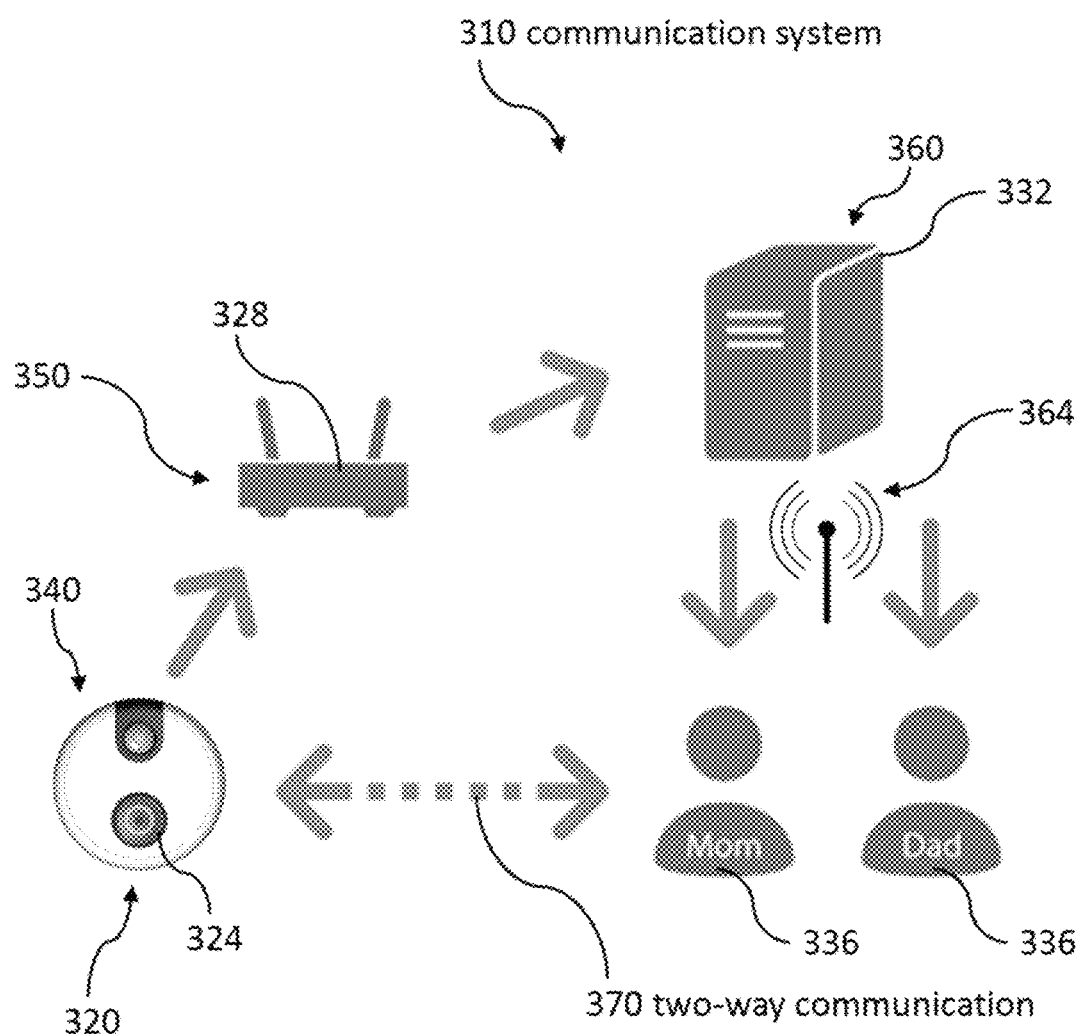
FIG. 5 illustrates a communication system that includes a security system, a doorbell button, a wireless router, a server, and users, according to some embodiments.
Figure 6A:
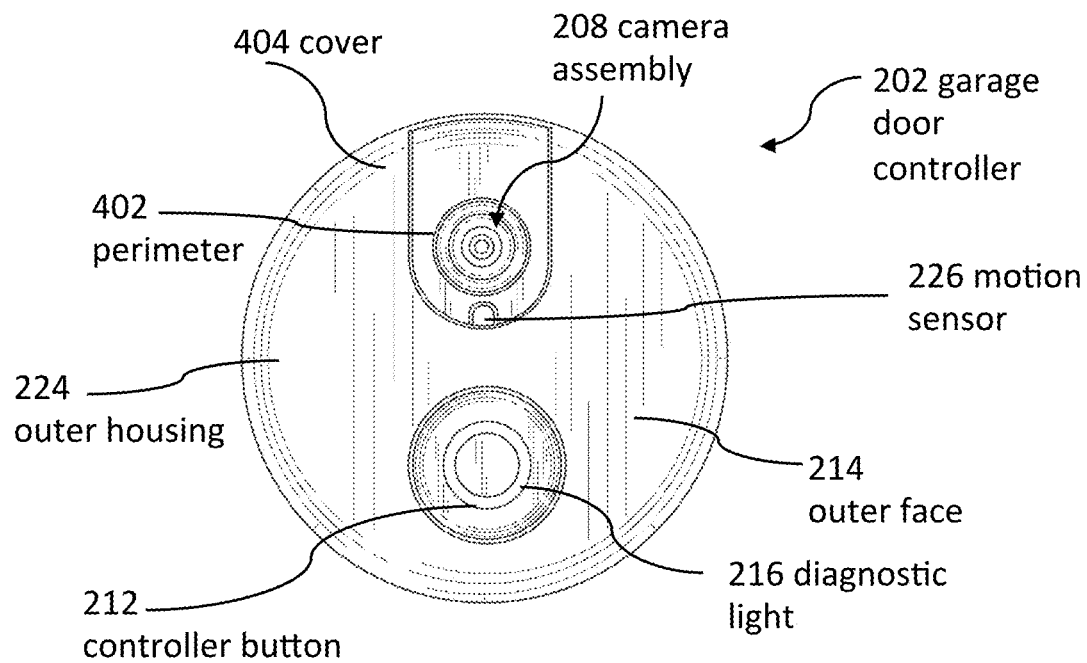
FIGS. 6a and 6b illustrate a front and a side perspective view of a garage door controller, according to some embodiments.
Figure 6B:
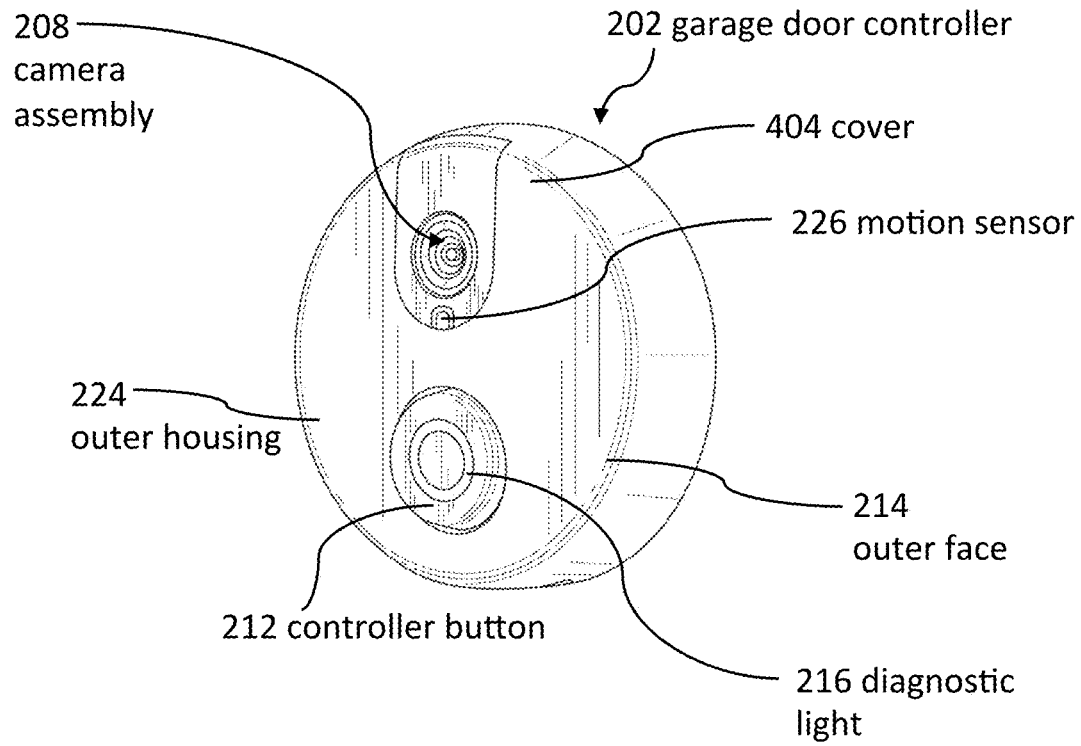

FIG. 5 illustrates a communication system 310 that includes a garage door controller 320, a controller button 324, a WiFi router 328, a server 332, and users 336. In step 340, a visitor initiates a communication request by pressing the doorbell button 324 or triggering a motion or proximity sensor. The visitor can trigger the motion or proximity sensor by approaching the garage door controller 320. In step 350, the garage door controller 320 connects or otherwise communicates with a home WiFi router 328. In step 360, the server 332 receives a signal from the WiFi router 328 and sends video and/or audio to the users 336 via a wireless network 364. In step 370, the users see the visitor, hear the visitor, and talk with the visitor. Step 370 can include using a software application to see, hear, and/or talk with the visitor. The visitor and users 336 can engage in two-way communication 374 via the internet or other wireless communication system even when the visitor and the users 336 are located far away from each other. Some embodiments enable users to receive communication requests and communicate with visitors via diverse mobile communication standards including third generation ("3G"), fourth generation ("4G"), long term evolution ("LTE"), worldwide interoperability for microwave access ("WiMAX"), and WiFi.

In some cases, the users 336 utilize the garage door communication system 310 to communicate with visitors who are in close proximity to the users 336. For example, a user 336 located inside the building can communicate with a visitor located just outside the building via the communication system 310.

Some embodiments include a location detection system (e.g., GPS) to determine if the computing device 204 is located inside the building, near the building, within 100 feet of the building, within 100 feet of the garage door controller 202, within 50 feet of the building, and/or within 50 feet of the garage door controller 202, in which case the computing device 204 is considered in Close Mode. In some embodiments, the computing device 204 is considered in Close Mode if the computing device 204 is connected to a wireless network 308 of the building to which the garage door controller 202 is coupled. In several embodiments, the computing device 204 is considered in Close Mode if the computing device 204 and the garage door controller 202 are connected to the same wireless network 308. If the computing device 204 is not in Off Mode and not in Close Mode, then the computing device 204 is in Away Mode, in which the computing device 204 is considered to be located remotely from the building 300.

In several embodiments, the computing device 204 can behave differently in Close Mode than in Away Mode. In some embodiments, the computing device 204 will not notify the user of visitors if the computing device 204 is in Close Mode. In several embodiments, Close Mode silences alerts, which can include precluding and/or eliminating the alerts. Instead, the user might have to listen for typical indications of a visitor such as the ring of a traditional doorbell. Once the computing device 204 enters Away Mode, the computing device 204 can notify the user of the visitor. In some embodiments, the computing device 204 notifies the user regarding the visitor if the computing device 204 is in Close Mode or Away Mode.

In several embodiments, the user can decline a communication request by selecting via the user interface 240 a pre-recorded message to be played by the security system. The pre-recorded message can include audio and/or video content. Some embodiments can provide the user with options for playing a pre-recorded message on demand, and/or automatically playing a pre-recorded message under user-specified conditions. Examples of conditions that can be specified include time of day, user location, facial recognition or non-recognition of visitors, and/or number of recent visitors. In some embodiments, a pre-recorded message can interrupt two-way communications, which can resume after delivery of the message. In some embodiments, a pre-recorded message can be delivered without interrupting two-way communications.

In some embodiments, the garage door controller 202 includes a memory. If the garage door controller 202 cannot communicate with the computing device 204 and/or with the server 206 (shown in FIG. 1), the memory 492 of the garage door controller 202 can store a recorded message and/or video from the visitor. Once the garage door controller 202 can communicate with the computing device 204 and/or the server 206, the garage door controller 202 can communicate the recorded message and/or video to the computing device 204 and/or the server 206.

In several embodiments, the garage door controller 202 can ask a visitor to record a message and/or can record pictures (e.g., video, still pictures) when the garage door controller 202 cannot communicate via the wireless network 308. The garage door controller 202 can include a Network Enabled Mode and a Network Disabled Mode. In the Network Enabled Mode, the garage door controller 202 can communicate via the wireless network 308 with a remote server and/or computing device 204. In the Network Disabled Mode, the garage door controller 202 cannot communicate via the wireless network 308 with a remote server and/or computing device 204.

In the Network Enabled Mode, the garage door controller 202 can send video and/or audio from the visitor to the user instantaneously; nearly instantaneously; immediately; within 15 seconds of capturing the video and/or audio; and/or within 60 seconds of capturing the video and/or audio. In the Network Enabled Mode, the security system can preferentially send data (e.g., video, audio, traits, identification) regarding the visitor to the computing device 204 rather than storing the data in the memory of the security system. In the Network Disabled Mode, the garage door controller 202 can cause a chime inside the building 300 to emit a sound. In some embodiments of the Network Disabled Mode, the security system emits a visible error signal (e.g., flashing light, red light); records images and audio to the security system's memory; asks the visitor to leave a message for the user; and/or alerts the user regarding the lack of wireless communication.

In some embodiments, the security system can maintain a visitor log, which can capture information such as the date, time, audio, video, and/or images of the visitor. The user interface 240 can display this information in a "guest book" format; as a timeline or calendar; as a series of images, videos, and/or audio files; or as a log file.

The user can accept or decline a communication request from a visitor. In some embodiments, the user can push a button (e.g., 276) on the user interface 240 (shown in FIG. 2) to decline a communication request or accept a communication request. The user can decline a communication request without the visitor knowing that the user received the communication request. Prior to accepting a communication request, the computing device 204 can allow the user to click a button, such as an icon on a graphical user interface on a touch screen, to see and/or hear the visitor. In some embodiments, accepting a communication request includes opening a two-way line of communication (e.g., audio and/or video) between the visitor and the user to enable the user to speak with the visitor.

A visitor can initiate a communication request and/or activate the garage door opener to move the garage door by pressing the controller button of the garage door controller 202, triggering a motion sensor of the garage door controller 202, triggering a proximity sensor of the garage door controller 202, and/or triggering an audio alarm of the garage door controller 202. In some embodiments, the audio alarm includes the microphone of the garage door controller 202. The garage door controller 202 can determine if sounds sensed by the microphone are from a knocking sound, a stepping sound, and/or from a human in close proximity to the garage door controller 202. The garage door controller 202 can detect important sounds such as knocking, talking, and footsteps by recording the sounds and then computing features that can be used for classification. Each sound class (e.g., knocking) has features that enable the garage door controller 202 to accurately identify the sound as knocking, talking, stepping, or extraneous noise. Features can be analyzed using a decision tree to classify each sound. For example, in some embodiments, a visitor can trigger an audio alarm (and thus, initiate a communication request) by knocking on a door located within hearing range of a microphone of the garage door controller 202. In several embodiments, a visitor can trigger an audio alarm (and thus, initiate a communication request) by stepping and/or talking within hearing range of a microphone of the garage door controller 202.

The garage door controller 202 may receive audible instructions from a user to stop or move the garage door 927. For example, the garage door controller 202 may receive, by a microphone, a first audible message from the user. The first audible message may include an instruction to open the garage door 927, close the garage door 927, or stop the garage door 927. In response to receiving the first audible message to open the garage door 927, embodiments may include moving the garage door 927 to the open position 927a. Accordingly, in response to receiving the first audible message to close the garage door 927, embodiments may include moving the garage door to the closed position 927e. As well, in response to receiving the first audible message to stop the garage door 927, embodiments may include terminating movement of the garage door 927. As well, it should be appreciated that the audible instructions may include any such command to control the garage door 927 in a manner as known within the art.

Furthermore, in some embodiments, the garage door controller 202 may emit, by a speaker, a second audible message. The second audible message may include any type of information in about the garage door communication system 200. For example, the second audible message may include a notification about whether the garage door is open or closed.

As well, the garage door controller 202 may include a motion detector, which may be configured to detect motion from a user within a space adjacent the garage door controller 202. In some embodiments the motion detector may be located adjacent to the outer surface of the outer housing. The user's movements may serve as instructions for the garage door controller 202 to activate the garage door opener 926 to perform an operation. For example, the garage door controller 202 may detect a single wave motion from a user's hand, which may indicate that the user wishes to open the garage door 927. In response to the garage door controller 202 detecting the single wave motion from the user's hand, the garage door controller 202 may transmit a signal to the garage door opener 926 to thereby move the garage door 927 to the open position 927a.

As well, in some embodiments, the garage door controller 202 may detect a double wave motion from a user's hand, which may indicate that the user wishes to close the garage door 927. In response to the garage door controller 202 detecting the double wave motion from the user's hand, the garage door controller 202 may transmit a signal to the garage door opener 926 to thereby move the garage door 927 to the closed position 927e.

Generally, the garage door controller 202 may be configured to detect any predetermined motion, whereby the predetermined motion may correspond to any such predetermined action of the garage door opener 926 and the garage door 927. For example, the predetermined action may be selected from the group consisting of closing the garage door, opening the garage door, terminating movement of the garage door, illuminating the light, and deactivating the light. Furthermore, the predetermined motion may be any such bodily motion, such as a hand wave, a smile (from a user's face), and the like. In some embodiments, the garage door controller 202 may be configured to detect one, two, three, four, five, or more predetermined motions, which may correspond to one, two, three, four, five, or more predetermined actions.

In some embodiments, the garage door controller 202 may be configured to receive different types of button presses and initiate different operations based on the respective type of button press. For example, the garage door controller 202 may receive a first button press that is for a first predetermined period of time. In response to the first button press, the garage door controller 202 may initiate a first garage door operation, such as opening the garage door 927. In some embodiments, the garage door controller 202 may receive a second button press, which is for a second predetermined period of time that is different than the first predetermined period of time. In response to the second button press, the garage door controller 202 may initiate a second garage door operation, such as closing the garage door 927. In some embodiments, the first button press comprises at least one button press, and the second button press comprises at least two button presses. Generally, it should be appreciated that the garage door controller 202 may be configured to recognize different types of buttons presses and thereby perform different operations for each type of button press.

Installation Methods

Embodiments may also include a method for installing a garage door controller. For example, some embodiments may include replacing a conventional garage door controller, such as a first garage door controller, that is wired to a garage door opener. The embodiments may include replacing the conventional garage door controller with a second garage door controller, such as garage door controller 202. The first garage door controller may comprise a button configured to open and close a circuit between a power supply and a garage door opener to thereby allow electricity to flow through the garage door opener to thereby move a garage door between an open position 927a and a closed position 927e. As well, the second garage door controller 202 may include an outer housing, a button configured to open and close the circuit between the power supply and the garage door opener, and a wireless communication module configured to communicatively couple to a remote computing device via WiFi or cellular communication.

Some embodiments of the first garage door controller may be electrically coupled to two or more electrical wires that are electrically coupled to the garage door opener. In this regard, some methods may include electrically decoupling the first garage door controller from a first wire, wherein the first wire is electrically coupled to the garage door opener. As well, embodiments may include electrically decoupling the first garage door controller from a second wire, wherein the second wire is electrically coupled to the garage door opener.

Once the two or more electrical wires have been electrically decoupled from the first garage door controller, the second garage door controller 202 may then be installed. Accordingly, some embodiments may include electrically coupling the second garage door controller to the first wire and electrically coupling the second garage door controller to the second wire.

Some methods may also include communicatively coupling the second garage door controller to an Internet router to thereby communicatively couple the second garage door controller to a wireless network. As well, methods may include communicatively coupling the second garage door controller, by the Internet router, to a remote server, and communicatively coupling the second garage door controller, by the Internet router and the remote server, to the remote computing device. In this manner, a user may upgrade his or her conventional garage door system to a "smart" garage door system that is capable of being accessed and controlled via the Internet.

Some embodiments of the second garage door controller 202 may include a camera configured to record a video. According to these embodiments, some methods may further include arranging and configuring the second garage door controller 202 such that at least a portion of the garage door 927 is located within a line of sight of the camera 208. This may allow a remotely located user to view, by the camera 208, at least a portion of the garage door 927.

Safety Sensor Embodiments

Some embodiments of conventional garage door systems may include safety sensors configured to detect whether a person, animal or object crosses a path of the garage door 927 while the garage door 927 is moving. In this regard, the safety sensors may trigger the garage door opener 926 to terminate movement to thereby avoid the garage door 927 coming into contact with the person, animal or object. Specifically, embodiments the garage door opener 926 may be electrically coupled to a first safety sensor and a second safety sensor. The first safety sensor can be located at a first location adjacent a first vertical surface of the garage door frame 931. Accordingly, the second safety sensor can be located at a second location adjacent a second vertical surface of the garage door frame 931. The first vertical surface can be horizontally spaced from the second vertical surface such that the first vertical surface faces the second vertical surface.

Some embodiments of the garage door controller 202 include arranging and configuring various components, such as the camera 208, to detect whether an object enters a line of sight between the first location and the second location. In this manner, the garage door controller 202 can be configured to detect whether an object enters a line of sight between the first location and the second location. In response to the garage door controller 202 detecting a person, animal, and/or object entering the line of sight between the first location and the second location, the garage door controller 202 can send a command to the garage door opener 926 to terminate movement. Accordingly, embodiments may include method steps for replacing the existing safety sensors of a garage door 927.

Generally, the garage door controller 202 can include detection features that replace the safety sensors of a conventional garage door system. Accordingly, some embodiments can include removing the existing safety sensors of a conventional garage door system. For example, in some embodiments a third wire is electrically coupled between the first safety sensor and a first terminal on the garage door opener 926, and a fourth wire is electrically coupled between the second safety sensor and a second terminal on the garage door opener 926. In this manner, embodiments may include electrically decoupling the first safety sensor and any corresponding wire or wires, such as the third wire, from the garage door opener 926, and electrically decoupling the second safety sensor and any corresponding wire or wires, such as the fourth wire, from the garage door opener 926. As well, methods may include electrically coupling a jumper between the first terminal and the second terminal of the garage door opener 926, whereby the jumper completes an electrical circuit between the second garage door controller and the garage door opener 926 to thereby allow the garage door 927 to move between the open and closed positions.

In some embodiments the garage door frame defines both a first vertical inner surface, a second vertical inner surface that faces the first vertical inner surface, and a first horizontal inner surface that faces a ground surface whereby the first horizontal inner surface extends between the first vertical inner surface and the second vertical inner surface. The space can be a plane that is parallel to the garage door 927 when the garage door 927 is in the closed position 927e. The plane can be located between the garage door opener 926 and the garage door 927 when the garage door 927 is in the closed position 927e. Accordingly, some embodiments include using the camera 208 to detect whether an object breaks a portion of the plane in a location between the first vertical inner surface, the second vertical inner surface, the first horizontal inner surface, and the ground surface. In response to detecting that an object has entered a portion of the plane, some methods may also include using the garage door controller to terminate movement of the garage door opener 926. As well, in response to detecting that no object has entered a portion of the plane, embodiments may include using the garage door controller to move the garage door 927 to the open position 927a, partially open position 927b, 927c, 927d, or closed position 927e.

Generally, by detecting whether an object enters a path of the garage door 927, the garage door controller 202 can terminate movement of the garage door 927 to avoid an accident. Furthermore, because the camera 208 is able to monitor entire plane between the vertical surfaces and the horizontal surface of the garage door frame 931, the camera 208 may increase safety over conventional garage door systems. In conventional garage door systems, the safety sensors are located towards the ground surface. In effect, conventional safety sensors are only able to monitor whether an object crosses the plane towards the ground surface. However, the garage door controller 202 may detect whether an object crosses the plane at any height. For example, if a car bumper crosses the plane, a conventional garage door system may fail to detect the presence of the bumper; thus, the conventional garage door may contact the car bumper. However, the garage door controller 202 may detect an object at any height or location on the plane, such as the car bumper, and the garage door controller 202 may thereby terminate movement of the garage door to avoid an accident.

In some embodiments, the space or plane that extends between the vertical surfaces is a line that extends between a first point and a second point adjacent the garage door frame 931. The first point can be coordinated at a first vertical location and a first horizontal location. The second point can be substantially coordinated at the first vertical location and a second horizontal location. It should be appreciated that the term substantially means about or for the most part. As well, the first vertical location is located along a lower portion of the garage door frame. Wherein the first horizontal location is horizontally spaced from the second horizontal location such that the first and second horizontal locations are disposed at opposite sides of the garage door frame 931.

With the popularity of online shopping and other service that require shipping, package theft is on the rise. Parcel carriers generally leave a package on the porch or in some other outdoor location. This leaves the package vulnerable to theft until it can be picked up by the owner, for example after work or after a trip. Consumers need a way to keep their deliveries safe until it is convenient for them to pick up the parcel and bring them inside. A security system that allows a parcel carrier and a user to communicate, and allows the user to remotely activate a device, such as a garage door opener would allow a parcel carrier to securely leave a package even when no one is able to receive the package. For example, a visitor, who may be a parcel carrier, may approach a front door and ring a doorbell. The security system may then alert a user, possibly by sending an alert to a mobile device. The user and the visitor can then communicate via the security system. The user can then ask the visitor to leave a package in, for example, the garage. The user could then remotely signal the garage door opener to open the garage door. The security system may also have a camera or a sensor in or near the garage to alert the user that the visitor has entered and/or left the garage. The user can then remotely signal the garage door to close. The package is then secure inside the garage until the user is able to pick it up.

Figure 17:
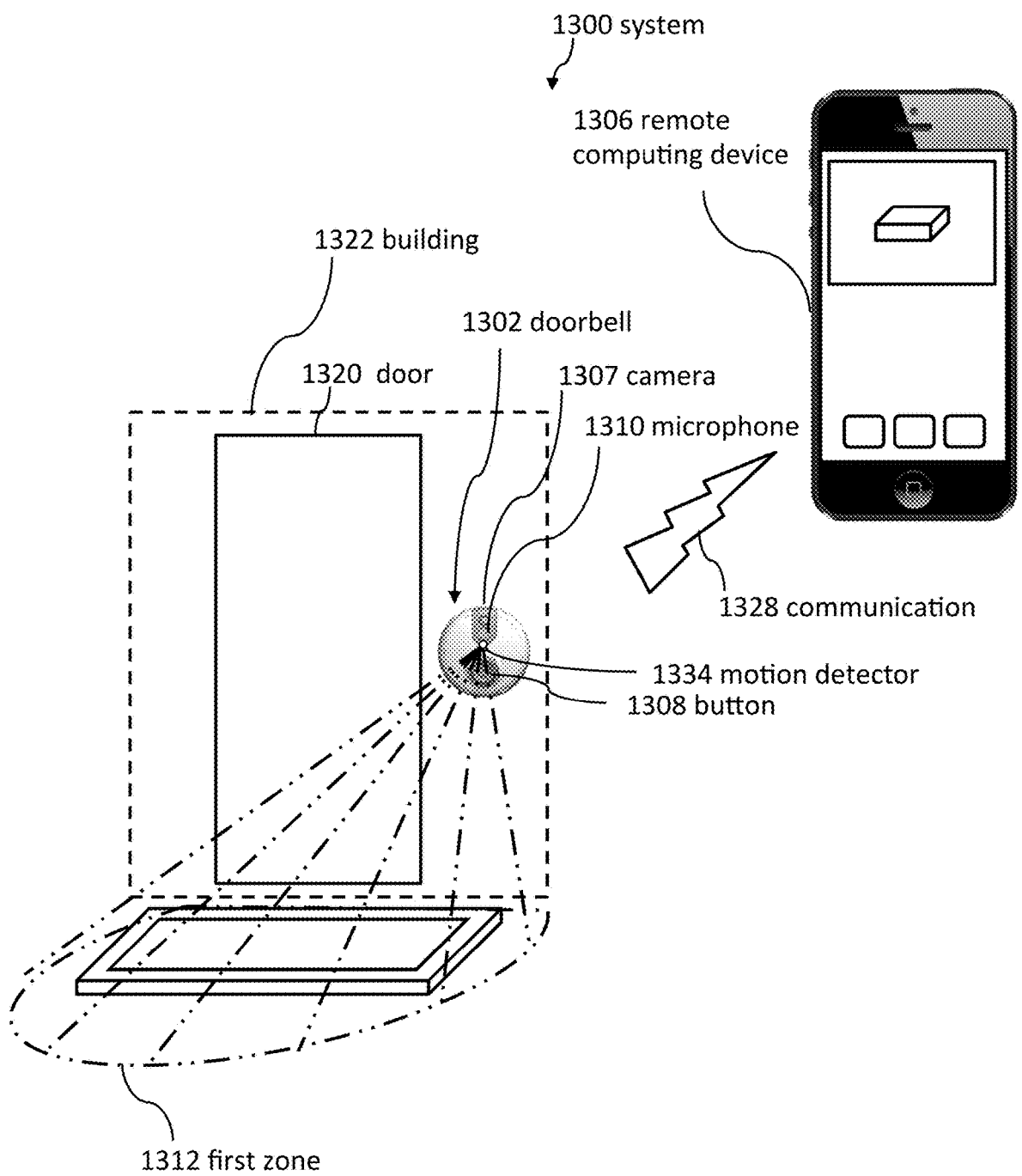
FIG. 17 illustrates a perspective view of a communication system in which the doorbell is connected to a building, according to some embodiments.
Figure 18:
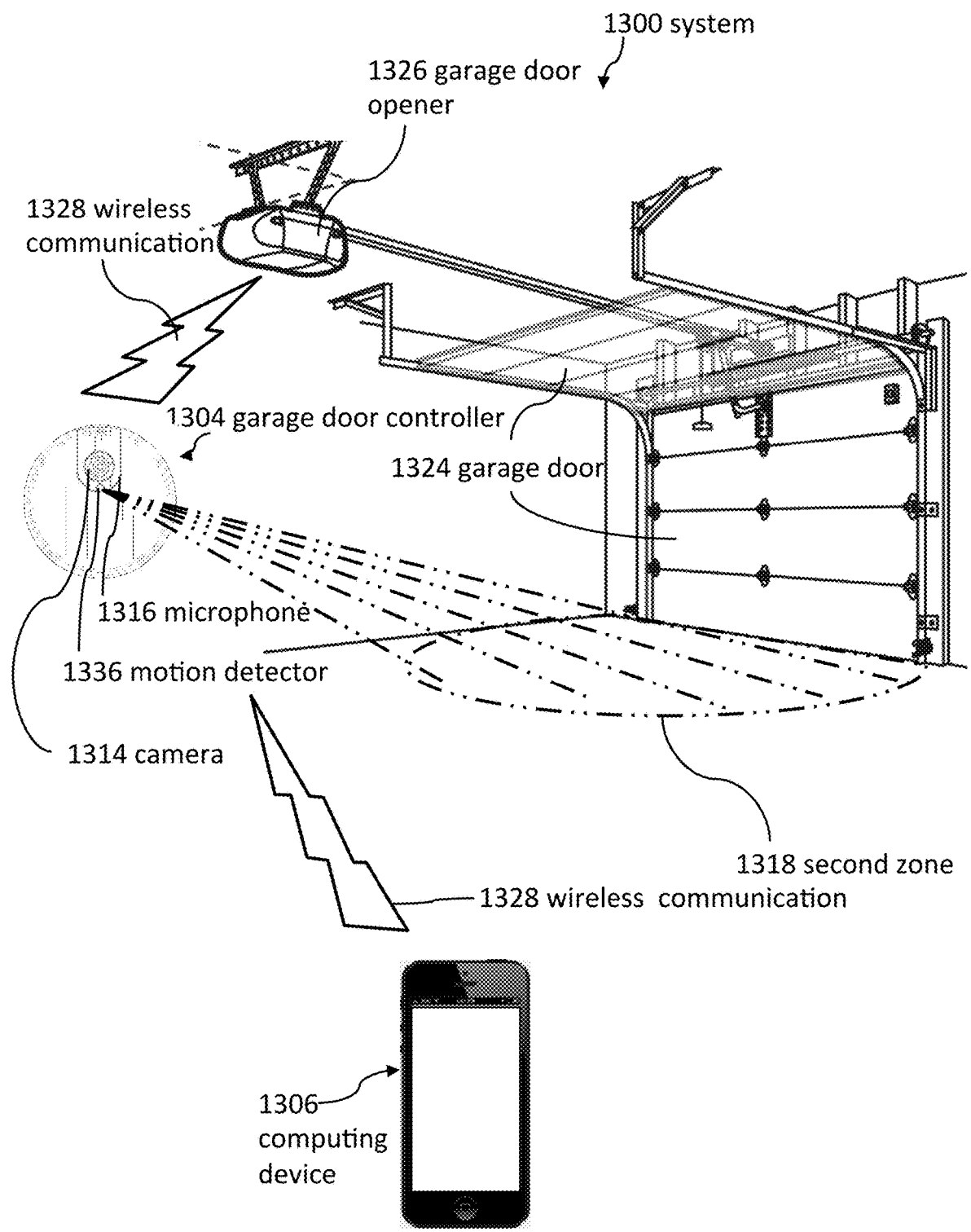
FIG. 18 illustrates a perspective view of a garage door communication system, according to some embodiments.

Referring now to FIGS. 17 and 18 a security system 1300 may include, among other things, an electronic doorbell 1302, an electronic garage door controller 1304, and a remote computing device 1306. The electronic doorbell 1302 may have a first camera 1307, a button 1308, and a first microphone 1310. The first camera 1307 can be configured to capture an image of a first zone 1312. The first zone 1312 may be, for example, a front porch. The button 1308 can be configured to enable a visitor to sound an electronic chime. The button 1308 may also be configured to send an alert to a remote computing device 1306 such as a mobile phone.

The first microphone 1310 can be configured to capture sounds. The electronic garage door controller 1304 may be communicatively coupled to the electronic doorbell 1302. The electronic garage door controller 1304 may be directly or indirectly communicatively coupled to the electronic doorbell 1302. The electronic garage door controller may communicate via, for example, a wireless communication 1328 with a garage door opener 1326. The electronic garage door controller 1304 may have a second camera 1314 and a second microphone 1316. The second camera may be configured to capture an image of a second zone 1318. The second zone 1318 may be, for example, the inside of a garage. The second microphone 1316 may be configured to capture sounds. The remote computing device 1306 may be communicatively coupled to at least one of the electronic doorbell 1302 and the electronic garage door controller 1304. The remote computing device 1306 may be directly or indirectly communicatively coupled to at least one or the electronic doorbell 1302 and the electronic garage door controller 1304. The remote computing device 1306 may be configured to display at least one of the image of the first zone 1312 and the image of the second zone 1318.

In some embodiments, the first zone 1312 may comprise an area adjacent a door 1320 of a building 1322. For example the first zone 1312 may be an area near the front door or a back door. The second zone 1318 may comprise an area located at least partially within a garage. In response to the system 1300 receiving input from the user to open the garage door 1324, the image displayed by the screen of the remote computing device 1306 may switch from the images from the first camera 1307 to the images from the second camera 1314. In response to the system 1300 receiving input from the user to open the garage door 1324, the sound transmitted by the remote computing device 1306 may switch from the sound from the first microphone 1310 to the sound from the second microphone 1316. The remote computing device 1306 may be configured to run a software application comprising executable instructions that when executed, cause the security system 1300 to effectuate operations. Operations may comprise displaying, by a screen of the remote computing device 1306, the image of the first zone 1312. Operations may comprise receiving, by the remote computing device 1306, an input from a user to open a garage door 1324 associated with the electronic garage door controller 1304. Operations may comprise in response to receiving the input to open the garage door 1324, displaying, by the screen of the remote computing device 1306, the image of the second zone 1318. The executable instructions may cause the security system 1300 to effectuate operations further comprising opening, by a garage door opener 1326 coupled to the electronic garage door controller 1304, the garage door 1324 in response to receiving the input to open the garage door 1324.

In some embodiments the image displayed on the screen of the remote computing device 1306 may switch from images from the first camera 1307 to images from the second camera 1314 in response to the system 1300 receiving an indication that the visitor is moving towards the second zone 1318. The remote computing device 1306 may be configurable to run a software application. The software application may comprise executable instructions that when executed, cause the security system 1300 to effectuate operations. The operations may comprise displaying, by a screen of the remote computing device 1306, the image of the first zone 1312. The operations may comprise receiving, by the security system 1300, an indication the visitor is moving from the first zone 1312 towards the second zone 1318. The operations may comprise in response to receiving the indication that the visitor is moving from the first zone 1312 towards the second zone 1318, displaying, by the screen of the remote computing device 1306, the image of the second zone 1318.

In several embodiments, the indication may comprise at least one of global position system data, a wireless connectivity signal between the electronic doorbell 1302 and a remote computing device 1306 of the visitor, and a motion detected by a motion detector 1334 of the electronic doorbell, the visitor visually leaving the first zone 1312 and/or visually entering the second zone 1318. Global position system data may comprise a GPS signal that shows the visitor moving towards the second zone 1318. The wireless connectivity signal between 1328 the electronic doorbell 1302 and the remote computing device 1306 of the visitor may be Bluetooth. For example, the doorbell 1302 could transmit information to the visitor's remote computing device via Bluetooth, and then if the person walks away, the signal strength might decrease. The motion detected by a motion detector 1334 of the electronic doorbell 1302 may comprise the motion detector 1334 detecting the visitor moving towards the second zone 1318 (i.e. garage).

In several embodiments the image displayed on the screen of the remote computing device 1306 may switch from images from the first camera 1307 to images from the second camera 1314 in response to the system 1300 visually determining that visitor is not within the first zone 1312. The remote computing device 1306 may be configured to run a software application comprising executable instructions. The executable instructions being executed may cause the security system 1300 to effectuate operations. Effectuating operations may include displaying, by a screen of the remote computing device 1306, the image of the first zone 1312. Effectuating operations may include determining, by at least one of the first camera 1307 and the security system, whether the visitor is located within the first zone 1312. Effectuating operations may include, in response to determining that the visitor is not located within the first zone 1312, displaying, by the screen of the remote computing device 1306, the image of the second zone 1318. The image displayed on the screen of the remote computing device 1306 may switch from images from the first camera 1307 to images from the second camera 1314 in response to the system visually determining that visitor is within the second zone 1318. The remote computing device 1306 may be configured to run a software application comprising executable instructions that when executed, may cause the security system to effectuate operations. The operations may comprise displaying, by a screen of the remote computing device 1306, the image of the first zone 1312. The operations may comprise determining, by at least one of the second camera 1314 and the security system, whether the visitor is located within the second zone 1318. The operations may comprise in response to determining that the visitor is located within the second zone 1318, displaying, by the screen of the remote computing device 1306, the image of the second zone 1318.

In some embodiments the image displayed on the screen of the remote computing device 1306 may switch from images from the first camera 1307 to images from the second camera 1314 in response to the system detecting a sound that may indicate that the visitor is walking towards the second zone 1318. Detecting a sound that may indicate a visitor is walking towards the second zone 1318 can include the system detecting a first sound and a second sound. The system may then determine that the second sound is quieter than the first sound. The system may determine if the second sound is below a threshold. The system determining one or both of the second sound being quieter than the first sound and the second sound is below a threshold may indicate that the visitor is walking towards the second zone. The remote computing device 1306 may be configured to run a software application comprising executable instructions that when executed, cause the security system to effectuate operations. Operations may comprise displaying, by a screen of the remote computing device 1306, the image of the first zone 1312. Operations may comprise capturing, by the first microphone 1310, a first sound and a second sound that occurs after the first sound. Operations may comprise determining, by the security system, whether the second sound is quieter than the first sound and whether the second sound is less than a predetermined threshold. Operations may comprise in response to determining that the second sound is quieter than the first sound and that the second sound is less than the predetermined threshold, displaying, by the screen of the remote computing device 1306, the image of the second zone 1318.

In several embodiments the image displayed on the screen of the remote computing device 1306 may switch from images from the first camera 1307 to images from the second camera 1314 in response to the system detecting a sound and determining that the sound is closer to the second microphone 1316 than the first microphone 1310. A system detecting a sound and determining that the sound is closer to the second microphone 1316 than the first microphone 1310 may include the system determining that the second sound is louder than the first sound. The remote computing device 1306 may be configured to run a software application comprising executable instructions that when executed, cause the security system to effectuate operations. Operations may comprise displaying, by a screen of the remote computing device 1306, the image of the first zone 1312. Operations may comprise capturing, by both the first microphone 1310 and the second microphone 1316, a sound. Operations may comprise determining, by the security system, whether the sound is greater with respect to one of the first microphone 1310 and the second microphone 1316. Operations may comprise in response to determining that the sound is greater with respect to the second microphone 1316 than the first microphone 1310, displaying, by the screen of the remote computing device 1306, the image of the second zone 1318. In response to the system detecting a sound and determining that the sound is closer to the first microphone 1310 than the second microphone 1316 the image displayed on the screen of the remote computing device 1306 may be the image from the first camera 1307. A system detecting a sound and determining that the sound is closer to the first microphone 1310 than the second microphone 1316 may include the system determining that the first sound is louder than the second sound. The remote computing device 1306 may be configured to run a software application comprising executable instructions that when executed, cause the security system to effectuate operations. The operations may comprise displaying, by a screen of the remote computing device 1306, the image of the first zone 1312. Operations may comprise capturing, by both the first microphone 1310 and the second microphone 1316, a sound. Operations may comprise determining, by the security system, whether the sound is greater with respect to one of the first microphone 1310 and the second microphone 1316. Operations may comprise in response to determining that the sound is greater with respect to the first microphone 1310 than the second microphone 1316, continuing to display, by the screen of the remote computing device 1306, the image of the first zone 1312.

In some embodiments the image displayed on the screen of the remote computing device 1306 may switch from images from the first camera 1307 to images from the second camera 1314 in response to the system tracking the location of the visitor. Tracking the location of the visitor may include, among other things, visually tracking, tracking with GPS via the visitor's mobile phone, or tracking with Bluetooth via the visitor's mobile phone. The remote computing device 1306 may be configured to run a software application comprising executable instructions that when executed, cause the security system to effectuate operations. Operations may comprise displaying, by a screen of the remote computing device 1306, the image of the first zone 1312. Operations may comprise determining, by the security system, a location of the visitor. Operations may comprise in response to determining that the location of the visitor is at least one of outside of the first zone 1312 and moving towards the second zone 1318, displaying, by the screen of the remote computing device 1306, the image of the second zone 1318.

Several embodiments may include a method of using a security system comprising an electronic doorbell 1302. The electronic doorbell 1302 may have a first camera 1307 configured to capture an image of a first zone 1312, a button 1308 configured to enable a visitor to sound an electronic chime, and a first microphone 1310 configured to capture sounds. The security system may include an electronic garage door controller 1304 communicatively coupled to the electronic doorbell 1302. The electronic garage door controller 1304 can be directly or indirectly communicatively coupled the electronic doorbell 1302. The electronic garage door controller 1304 may comprise a second camera 1314 configured to capture an image of a second zone 1318, and a second microphone 1316 configured to capture sounds. The security system may comprise a remote computing device 1306 communicatively coupled to at least one of the electronic doorbell 1302 and the electronic garage door controller 1304. The remote computing device 1306 can be directly or indirectly communicatively coupled to at least one of the electronic doorbell 1302 and the electronic garage door controller 1304. The method may include displaying, by a screen of the remote computing device 1306, the image of the first zone 1312. The method may include receiving, by the security system, an indication comprising one of the visitor moving from the first zone 1312 towards the second zone 1318 and the user authorizing the visitor to access the second zone 1318. The method may comprise displaying, by the screen of the remote computing device 1306, the image of the second zone 1318 in response to receiving the indication.

In some embodiments the first zone 1312 may comprise an area adjacent a door 1320 of a building 1322, and the second zone 1318 may comprise an area located at least partially within a garage. The image displayed on the screen of the remote computing device 1306 may switch from images from the first camera 1307 to images from the second camera 1314 in response to the system receiving input from user to open the garage door 1324. The indication may comprise an input from a user to open a garage door 1324 associated with the electronic garage door controller 1304. Input from the user to open a garage door 1324 may be remote input. The method may comprise opening, by a garage door opener 1326 coupled to the electronic garage door controller 1304, the garage door 1324 in response to receiving the input to open the garage door 1324. The image displayed on the screen of the remote computing device 1306 may switch from images from the first camera 1307 to images from the second camera 1314 in response to a second motion detector 1336 detecting motion, which could be visitor walking from first zone 1312 to second zone 1318. The second motion detector 1336 may be located remotely with respect to the electronic doorbell 1302 and the electronic garage door controller 1304. The second motion detector 1336 may be located in a third zone. The third zone may be in between the first and second zones. Receiving, by the security system, the indication may comprise detecting, by a second motion detector 1336, a motion of the visitor.

In order to reduce energy usage and system storage, the whole security system or a part of the security system may be able to enter a sleep mode. A sleep mode may use less electricity and/or use less system storage than an active mode. In some embodiments, the first camera can enter a sleep mode in response to the visitor moving from first zone 1312 to second zone 1318. The camera may also enter a sleep mode in response to the user authorizing the visitor access to the second zone 1318. In response to receiving the indication that the visitor is moving from the first zone 1312 towards the second zone 1318 and/or the user authorizing the visitor to access the second zone 1318, the method may include entering, by the first camera 1307 of the electronic doorbell 1302, a camera sleep mode whereby the first camera 1307 does not capture images. In some embodiments the second camera 1314 may enter an active mode in response to the visitor moving from first zone 1312 to second zone 1318 or user authorizing the visitor access to the second zone 1318. In response to receiving the indication that one of the visitor is moving from the first zone 1312 towards the second zone 1318 and the user authorizing the visitor to access the second zone 1318, the method may include entering, by the second camera of the electronic garage door controller 1304, an active mode. An active mode may include a camera live view mode whereby the second camera 1314 captures images. The whole system or a part of the system can enter a sleep or active mode in response to a user indication.

In some embodiments the image displayed on the screen of the remote computing device 1306 may switch from images from the first camera 1307 to images from the second camera 1314 in response to the visitor giving an indication that the visitor will be entering the second zone 1318. The indication may be a predetermined motion from the visitor such as a hand wave, or some special sign.

Interpretation

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments include A, B, and C. The term "and/or" is used to avoid unnecessary redundancy.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

What is claimed is:

1. A security system, comprising:
an electronic doorbell comprising a first camera configurable to capture an image of a first zone, a first button configurable to enable a visitor to sound an electronic chime, a motion detector configurable to detect a motion of the visitor, and a first microphone configurable to capture sounds; and
an electronic garage door controller communicatively coupled to at least one of the electronic doorbell, a remote server, and a remote computing device, the electronic garage door controller comprising a housing, a speaker coupled to the housing and configured to emit sounds, a diagnostic light coupled to the housing, a power indicator light coupled to the housing, a second button coupled to the housing and configurable to enable a visitor to sound an electronic chime, a second camera configurable to capture an image of a second zone, and a second microphone configurable to capture sounds; and
a software application configured to run on the remote computing device communicatively coupled to at least one of the electronic doorbell and the electronic garage door controller, wherein the remote computing device is configurable to display at least one of the image of the first zone and the image of the second zone,
wherein the software application comprises executable instructions that when executed, cause the security system to effectuate operations comprising:
displaying, by a screen of the remote computing device, the image of the first zone;
receiving, by the remote computing device, an input from a user to open a garage door associated with the electronic garage door controller; and
in response to receiving the input to open the garage door, displaying, by the screen of the remote computing device, the image of the second zone.

2. The security system of claim 1, wherein the first zone comprises an area adjacent a door of a building, and the second zone comprises an area located at least partially within a garage.

3. The security system of claim 1, wherein the executable instructions cause the security system to effectuate operations further comprising opening, by a garage door opener coupled to the electronic garage door controller, the garage door in response to receiving the input to open the garage door.

4. The security system of claim 2, wherein the remote computing device is configurable to run a software application comprising executable instructions that when executed, cause the security system to effectuate operations comprising:
displaying, by a screen of the remote computing device, the image of the first zone;
receiving, by the security system, an indication the visitor is moving from the first zone towards the second zone; and
in response to receiving the indication that the visitor is moving from the first zone towards the second zone, displaying, by the screen of the remote computing device, the image of the second zone.

5. The security system of claim 4, wherein the indication comprises at least one of global position system data, a wireless connectivity signal between the electronic doorbell and a remote computing device of the visitor, and the motion detected by the motion detector of the electronic doorbell.

6. The security system of claim 2, wherein the remote computing device is configurable to run a software application comprising executable instructions that when executed, cause the security system to effectuate operations comprising:
displaying, by a screen of the remote computing device, the image of the first zone;
determining, by at least one of the first camera and the security system, whether the visitor is located within the first zone; and
in response to determining that the visitor is not located within the first zone, displaying, by the screen of the remote computing device, the image of the second zone.

7. The security system of claim 6, wherein the remote computing device is configurable to run a software application comprising executable instructions that when executed, cause the security system to effectuate operations comprising:
displaying, by the screen of the remote computing device, the image of the first zone;
determining, by at least one of the second camera and the security system, whether the visitor is located within the second zone; and
in response to determining that the visitor is located within the second zone, displaying, by the screen of the remote computing device, the image of the second zone.

8. The security system of claim 2, wherein the remote computing device is configurable to run a software application comprising executable instructions that when executed, cause the security system to effectuate operations comprising:
displaying, by a screen of the remote computing device, the image of the first zone;
capturing, by the first microphone, a first sound and a second sound that occurs after the first sound;
determining, by the security system, whether the second sound is quieter than the first sound and whether the second sound is less than a predetermined threshold; and
in response to determining that the second sound is quieter than the first sound and that the second sound is less than the predetermined threshold, displaying, by the screen of the remote computing device, the image of the second zone.

9. The security system of claim 2, wherein the remote computing device is configurable to run a software application comprising executable instructions that when executed, cause the security system to effectuate operations comprising:
displaying, by a screen of the remote computing device, the image of the first zone;
capturing, by both the first microphone and the second microphone, a sound;
determining, by the security system, whether the sound is greater with respect to one of the first microphone and the second microphone; and
in response to determining that the sound is greater with respect to the second microphone than the first microphone, displaying, by the screen of the remote computing device, the image of the second zone.

10. The security system of claim 2, wherein the remote computing device is configurable to run a software application comprising executable instructions that when executed, cause the security system to effectuate operations comprising:
displaying, by a screen of the remote computing device, the image of the first zone;
capturing, by both the first microphone and the second microphone, a sound;
determining, by the security system, whether the sound is greater with respect to one of the first microphone and the second microphone; and
in response to determining that the sound is greater with respect to the first microphone than the second microphone, continuing to display, by the screen of the remote computing device, the image of the first zone.

11. The security system of claim 2, wherein the remote computing device is configurable to run a software application comprising executable instructions that when executed, cause the security system to effectuate operations comprising:
displaying, by a screen of the remote computing device, the image of the first zone;
determining, by the security system, a location of the visitor; and
in response to determining that the location of the visitor is at least one of outside of the first zone and moving towards the second zone, displaying, by the screen of the remote computing device, the image of the second zone.

12. A method of using a security system comprising an electronic doorbell having a first camera configurable to capture an image of a first zone, a first button configurable to enable a visitor to sound an electronic chime, a first motion detector configurable to detect a first motion of the visitor, and a first microphone configurable to capture sounds, the security system comprising an electronic garage door controller communicatively coupled to the electronic doorbell, the electronic garage door controller comprising a housing, a speaker coupled to the housing and configured to emit sounds, a diagnostic light coupled to the housing, a power indicator light coupled to the housing, a second button coupled to the housing and configurable to enable a visitor to sound an electronic chime, a second camera configurable to capture an image of a second zone, and a second microphone configurable to capture sounds, the security system comprising a remote computing device communicatively coupled to at least one of the electronic doorbell and the electronic garage door controller, the method comprising:
displaying, by a screen of the remote computing device, the image of the first zone;
receiving, by the security system, an indication comprising one of the visitor moving from the first zone towards the second zone and a user authorizing the visitor to access the second zone; and
in response to receiving the indication, displaying, by the screen of the remote computing device, the image of the second zone.

13. The method of claim 12, wherein the first zone comprises an area adjacent a door of a building, and the second zone comprises an area located at least partially within a garage.

14. The method of claim 13, wherein the indication comprises an input from a user to open a garage door associated with the electronic garage door controller.

15. The method of claim 14, further comprising opening, by a garage door opener coupled to the electronic garage door controller, the garage door in response to receiving the input to open the garage door.

16. The method of claim 13, wherein receiving, by the security system, the indication comprises detecting, by a second motion detector located remote with respect to the electronic doorbell and the electronic garage door controller, a second motion of the visitor.

17. The method of claim 13, further comprising in response to receiving the indication that one of the visitor is moving from the first zone towards the second zone and the user authorizing the visitor to access the second zone, entering, by the first camera of the electronic doorbell, a camera sleep mode whereby the first camera does not capture images.

18. The method of claim 17, further comprising in response to receiving the indication that one of the visitor is moving from the first zone towards the second zone and the user authorizing the visitor to access the second zone, entering, by the second camera of the electronic garage door controller, a camera live view mode whereby the second camera captures images.

19. The method of claim 13, wherein the indication comprises a predetermined motion from the visitor.

20. The security system of claim 1, wherein the remote computing device comprises at least one of a computer, a laptop, a tablet, a mobile device, a smartphone, a cellular phone, and a wireless device.

* * * * *